(12) United States Patent
Yasui

(10) Patent No.: US 9,976,639 B2
(45) Date of Patent: May 22, 2018

(54) ELECTRIC ACTUATOR AND GEAR MECHANISM

(71) Applicant: NABTESCO CORPORATION, Tokyo (JP)

(72) Inventor: Tsutomu Yasui, Gifu (JP)

(73) Assignee: NABTESCO CORPORATION, Tokyo (JP)

( * ) Notice: Subject to any disclaimer, the term of this patent is extended or adjusted under 35 U.S.C. 154(b) by 90 days.

(21) Appl. No.: 15/012,430

(22) Filed: Feb. 1, 2016

(65) Prior Publication Data

US 2016/0223060 A1 Aug. 4, 2016

(30) Foreign Application Priority Data

Feb. 3, 2015 (JP) .................................. 2015-019343

(51) Int. Cl.
| | |
|---|---|
| *F16H 35/10* | (2006.01) |
| *F16H 1/46* | (2006.01) |
| *B64C 13/34* | (2006.01) |
| *F16H 37/08* | (2006.01) |

(52) U.S. Cl.
CPC ............ *F16H 35/10* (2013.01); *B64C 13/34* (2013.01); *F16H 1/46* (2013.01); *F16H 37/0826* (2013.01)

(58) Field of Classification Search
CPC ........ F16H 35/10; F16H 1/46; F16H 37/0826; F16H 3/72; B64C 13/34
See application file for complete search history.

(56) References Cited

U.S. PATENT DOCUMENTS

| 4,578,993 A | 4/1986 | Burandt |
| 4,688,744 A | 8/1987 | Aldrich |

(Continued)

FOREIGN PATENT DOCUMENTS

| EP | 1 310 699 A2 | 5/2003 |
| FR | 2 951 697 A1 | 4/2011 |

(Continued)

OTHER PUBLICATIONS

Extended European Search Report as issued in European Patent Application No. 16153797.2, dated Jul. 13, 2016.

*Primary Examiner* — Ramya P Burgess
*Assistant Examiner* — David R Morris
(74) *Attorney, Agent, or Firm* — Pillsbury Winthrop Shaw Pittman, LLP

(57) ABSTRACT

An electric actuator to be mounted on an object having a stationary section and a movable section is provided. The electric actuator is configured to actuate the movable section of the object. The electric actuator is provided with a case fixedly attached to the stationary section, and includes a gear mechanism provided in the case. The gear mechanism includes a rotational member rotatable about a common axis and connected with a first motor, an internal gear formed in the rotational member, a sun gear rotatable about the common axis and connected with a second motor, and a planetary gear provided between the internal gear and the sun gear. The planetary gear is connected with an output section for actuating the movable section of the object. The rotational member is rotatably supported a bearing provided between an inner surface of the case and an outer surface of the rotational member.

10 Claims, 14 Drawing Sheets

(56) References Cited

U.S. PATENT DOCUMENTS

| | | | | |
|---|---|---|---|---|
| 5,211,610 | A * | 5/1993 | Hurth | F16H 47/04 |
| | | | | 475/1 |
| 6,053,833 | A * | 4/2000 | Masaki | B60K 6/445 |
| | | | | 475/2 |
| 6,875,145 | B2 * | 4/2005 | McKay | B64C 13/24 |
| | | | | 475/263 |
| 7,100,870 | B2 | 9/2006 | Flatt | |
| 7,186,197 | B2 * | 3/2007 | Zordan | B64C 13/28 |
| | | | | 475/339 |
| 7,192,373 | B2 * | 3/2007 | Bucknor | B60K 6/445 |
| | | | | 180/65.22 |
| 7,753,821 | B2 * | 7/2010 | Ueda | F16H 1/48 |
| | | | | 475/331 |
| 8,251,850 | B2 * | 8/2012 | Phillips | B60K 6/365 |
| | | | | 475/5 |
| 8,336,817 | B2 | 12/2012 | Flatt | |
| 8,465,387 | B2 * | 6/2013 | Conlon | B60K 6/365 |
| | | | | 180/65.23 |
| 9,446,760 | B2 * | 9/2016 | Kiyokami | B60K 6/365 |
| 9,527,500 | B2 * | 12/2016 | Hayashi | B60K 6/445 |
| 9,656,659 | B2 * | 5/2017 | Shukla | B60W 20/10 |
| 2003/0100398 | A1 | 5/2003 | McKay et al. | |
| 2015/0300472 | A1 | 10/2015 | Park et al. | |
| 2016/0223430 | A1 * | 8/2016 | Yasui | G01M 13/021 |
| 2016/0230850 | A1 * | 8/2016 | Kanada | B60K 6/387 |
| 2016/0288780 | A1 * | 10/2016 | Shukla | B60W 20/10 |

FOREIGN PATENT DOCUMENTS

JP          H08-289503 A     11/1996
WO    WO 2014/081105 A1     5/2014

* cited by examiner

ELECTRIC ACTUATOR AND GEAR MECHANISM

CROSS-REFERENCE TO RELATED APPLICATIONS

This application is based on and claims the benefit of priority from Japanese Patent Application Serial No. 2015-019343 (filed on Feb. 3, 2015), the contents of which are hereby incorporated by reference in their entirety.

TECHNICAL FIELD

The present disclosure relates to an electric actuator equipped with a planetary gear mechanism.

BACKGROUND

Electric actuators that include a planetary gear mechanism have conventionally been used for various devices. For example, in the field of aircrafts, there is technical tendency of electrifying actuators in accordance with electrification of aircrafts.

Electric actuators including a jack screw and a gear have been known. For example, publications of U.S. Pat. No. 4,578,993 (hereunder referred to as Publication 1), U.S. Pat. No. 4,688,744 (hereunder referred to as Publication 2), U.S. Pat. No. 7,100,870 (hereunder referred to as Publication 3), U.S. Pat. No. 8,336,817 (hereunder referred to as Publication 4), disclose electric actuators having a planetary gear mechanism. When foreign substances enter into the gear in the electric actuator disclosed in Publications 2-4, jamming may occur in the gear. In order to release the jamming, Publications 2-4 propose separation mechanisms that include a clutch or a shear pin.

As for electric actuators having a jack screw, jamming may also happens in the jack screw. In order to release the jamming, mechanical separation is required. However, the mechanical separation can cause a delay (for instance, about 30 milliseconds delay). For this reason, a mechanism that performs mechanical separation is not used for main rudder faces of aircrafts.

The clutch mechanism is a mechanical separation mechanism that switches from a coupling state to a decoupling state. The shear pin mechanism causes a pin shaped member to be physically broken in order to release the jamming. However, these mechanisms are not sufficiently reliable.

SUMMARY

One object of the disclosure is to provide a highly-reliable electric actuator and gear mechanism that can rotate an output section continuously even when jamming occurs in a planetary gear mechanism.

The electric actuator according to the disclosure may include an output section that receives an reduced output from a first motor through a rotational member supported by a bearing and through an internal gear. More specifically, the output section receives an output from a second motor through a planetary gear mechanism that includes the internal gear, a sun gear, and a planetary gear.

A gear mechanism according to the disclosure may include an output section that receives a drive force supplied thereto through a rotational member supported by a bearing and through an internal gear. The output section receives another drive force supplied thereto other than the above-mentioned drive force through the internal gear, the sun gear, and the planetary gear.

The electric actuator and gear mechanism according to the disclosure are highly reliable and it is possible to rotate the output section continuously even when jamming occurs in the planetary gear mechanism.

Objects, features, and advantages of the above technique will become apparent from the following detailed description and the accompanying drawings.

DESCRIPTION OF THE PREFERRED EMBODIMENTS

Figure 1:
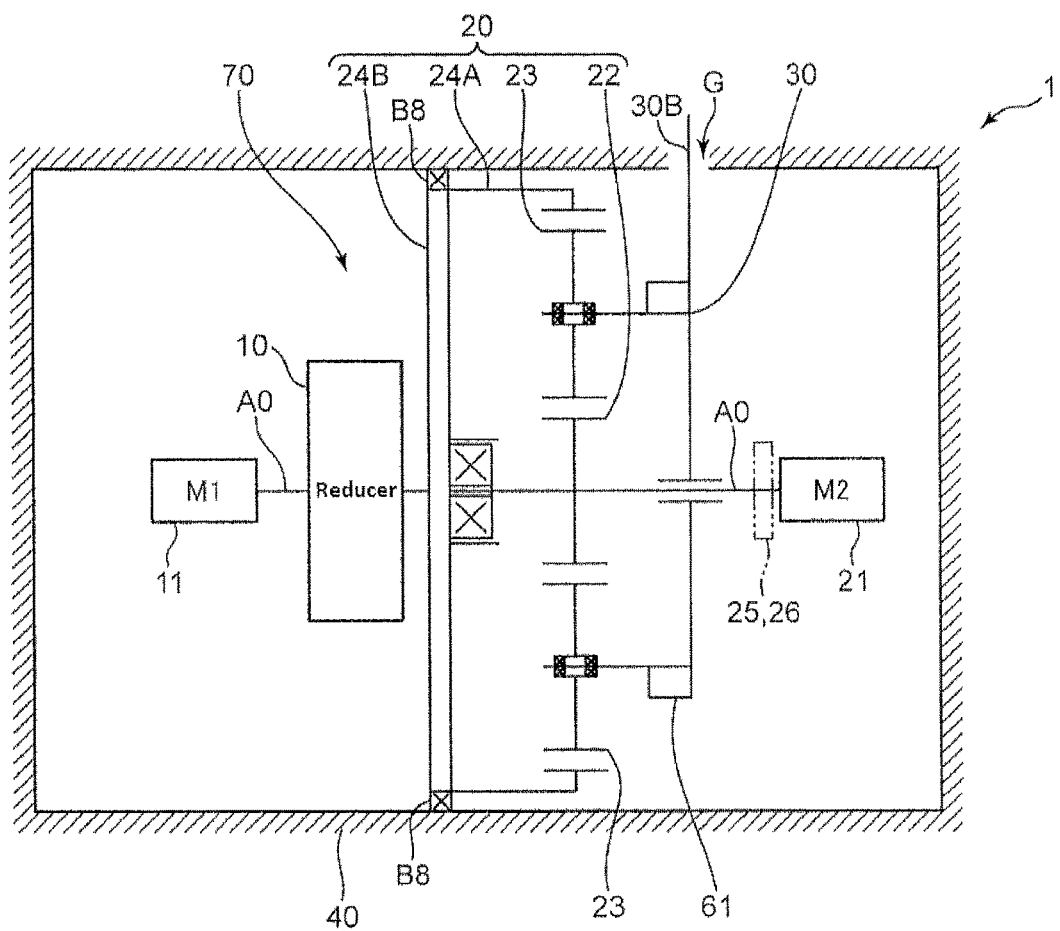
FIG. 1 is a power transmission diagram of an exemplary electric actuator.

An exemplary electric actuator 1 will be now described with reference to the accompanying drawings. FIG. 1 is a power transmission diagram of the electric actuator 1.

Referring to FIG. 1, the electric actuator 1 may include a first motor 11, a second motor 21, a gear mechanism 70, an output section 30, and a case 40. A portion or the entire of the first motor 11, the second motor 21, and gear mechanism 70 are housed in the case 40. The gear mechanism 70 may include a reduction mechanism 10 and a planetary gear mechanism 20.

The planetary gear mechanism 20 may include a sun gear 22, one or more planetary gears 23 meshing with the sun gear 22, an internal gear 24A having internal teeth engaging with the planetary gear 23, and a rotational member 24B. The rotational member 24B may be rotatably supported by a bearing B8 with respect to, for example, the case 40. The internal gear 24A rotates in accordance with rotation of the rotational member 24B. In this embodiment, the internal gear 24A rotates integrally with the rotational member 24B in the same direction.

Figure 9:
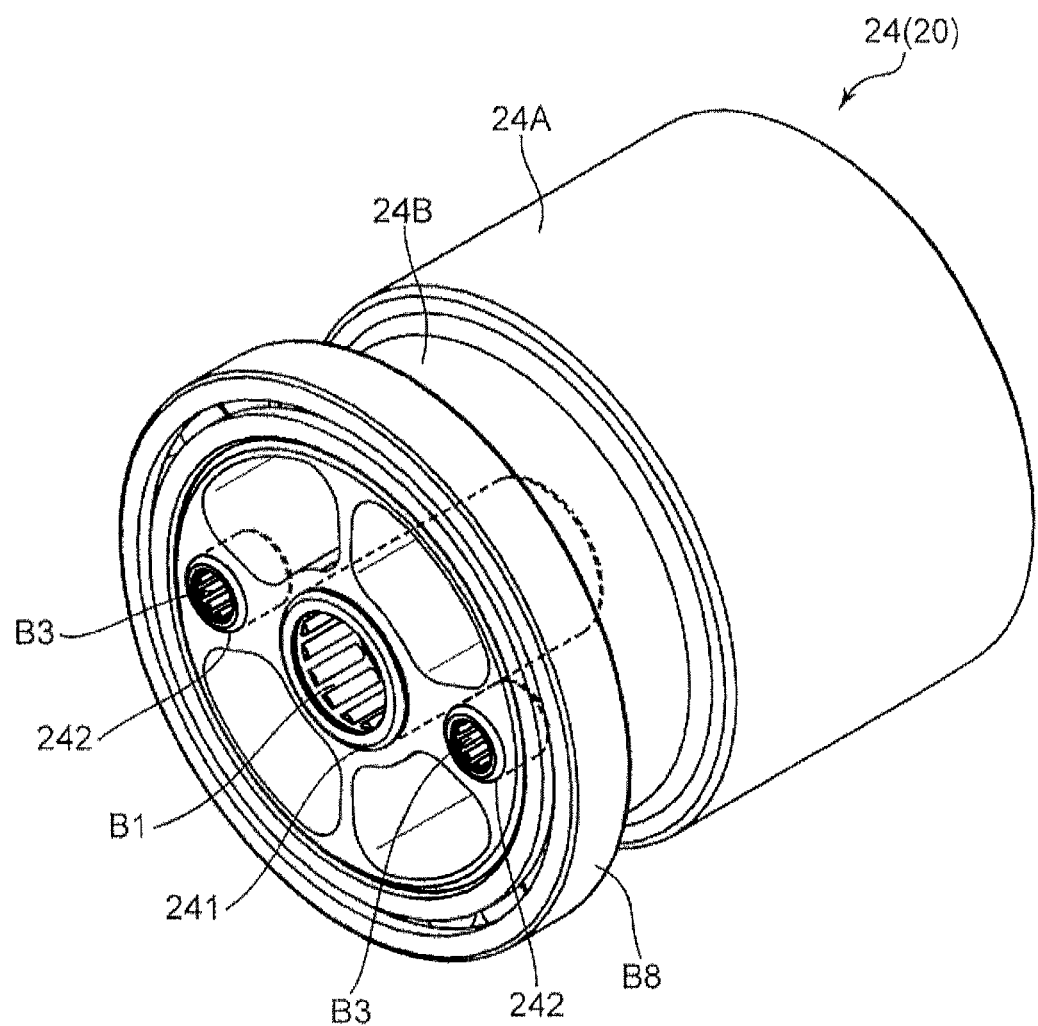
FIG. 9 is a perspective view showing a rotational member, a bearing that supports the rotational member, and a second internal gear in the exemplary electric actuator.

The internal gear 24A and the rotational member 24B form a gear member 24 (see FIG. 9). Referring to FIG. 9, the internal gear 24 may be integrally formed with the rotational member 24B to form the gear member 24. Alternatively, the internal gear 24A may be formed separately from the rotational member 24B. In this case, the internal gear 24A is coupled to the rotational member 24B.

The reduction mechanism 10 is configured to reduce an output from the first motor 11. The reduced output is transmitted to the rotational member 24B and causes the rotational member 24B to rotate. Various mechanisms and structures can be used as the reduction mechanism 10, such as a reducer having a planetary gear mechanism, a reducer having a gear mechanism that includes spur gears combined therein, and other reduction structures that reduce the output from the first motor 11 and transmit the reduced output to the rotational member 24B. In the electric actuator 1 illustrated in FIGS. 2-11, the planetary gear mechanism is used as the reduction mechanism 10.

The planetary gear 23 revolves around an axis of the sun gear 22. The output section 30 rotates in accordance with the revolution of the planetary gear 23.

In the electric actuator 1, the output from the first motor 11 is reduced by the reduction mechanism 10. As a result of the transmission of the reduced output to the rotational member 24B, the rotational member 24B is rotated. The internal gear 24A rotates in conjunction with the rotation of the rotational member 24B. As a result of the rotation of the internal gear 24A, the planetary gear 23 revolves around an axis A0 of the sun gear 22. This orbital motion of the planetary gear 23 is transmitted to the output section 30. Consequently the output section 30 is rotated. More specifically, the reduced output from the first motor 11 is transmitted to the output section 30 through the rotational member 24B supported by the bearing B8 and through the internal gear 24A.

In the electric actuator 1, the output from the second motor 21 is transmitted to the sun gear 22. Consequently, the sun gear 22 rotates around the axis A0. The rotation of the sun gear 22 causes the revolution of the planetary gear 23 (the revolution around the axis A0 of the sun gear 22) that meshes with the sun gear 22 and the internal teeth of the internal gear 24A. This orbital motion of the planetary gear 23 is transmitted to the output section 30. Consequently the output section 30 is rotated. More specifically, the output from the second motor 21 is transmitted to the output section 30 via the planetary gear mechanism 20 that includes the sun gear 22, the planetary gear 23, and the internal gear 24A.

When jamming occurs in the planetary gear mechanism 20 of the embodiment, the output from the second motor 21 cannot be transmitted to the output section 30. However, the output from the first motor 11 is transmitted to the output section 30 through the rotational member 24B and the internal gear 24A integrally formed with the rotational member 24B since the rotational member 24B is rotatably supported by the bearing B8 with respect to the case 40. When jamming occurs in the reduction mechanism 10, the output from the first motor 11 cannot be transmitted to the output section 30. Whereas the output from the second motor 21 is transmitted to the output section 30 through the planetary gear mechanism 20 that includes the sun gear 22, the planetary gear 23, and the internal gear 24A. Therefore according to the principle of the embodiment, the rotation of the output section 30 can be continued even when jamming occurs.

In the electric actuator 1 of the embodiment, an axial center of the first motor 11, an axial center of the rotational member 24B, an axial center of the second motor 21, an axial center of the sun gear 22, and an axial center of the revolution of the planetary gear 23 are coaxially arranged (with the axis A0). Therefore a designer of the electric actuator 1 may select a small dimension for the radial size of the actuator and can arrange the path of the output from the first motor 11 to the output section 30 and the path of the output from the second motor 21 to the output section 30 within the electric actuator 1. Therefore, the principle of the embodiment can contribute to minimize the size of the actuator in addition to the capability that the rotation of the output section 30 can be continued to rotate even when jamming occurs.

The electric actuator 1 will be further described in detail. The principle of the electric actuator 1 will not be limited by specific examples hereunder described.

Entire Structure of the Electric Actuator

Figure 2:
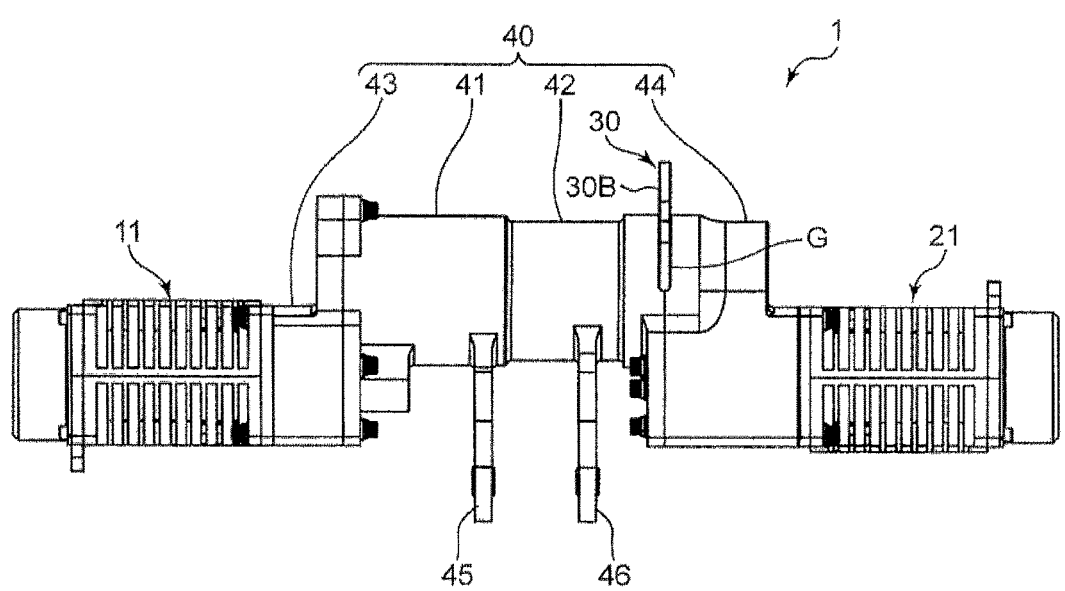
FIG. 2 is a front view of the exemplary electric actuator.
Figure 3:
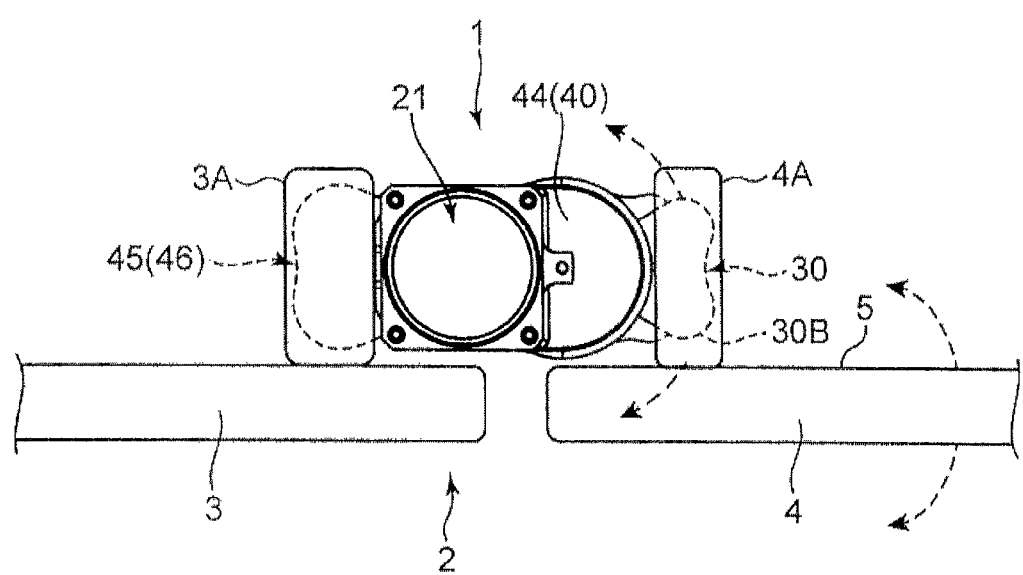
FIG. 3 is a side view of the electric actuator fixed on an apparatus.
Figure 4:
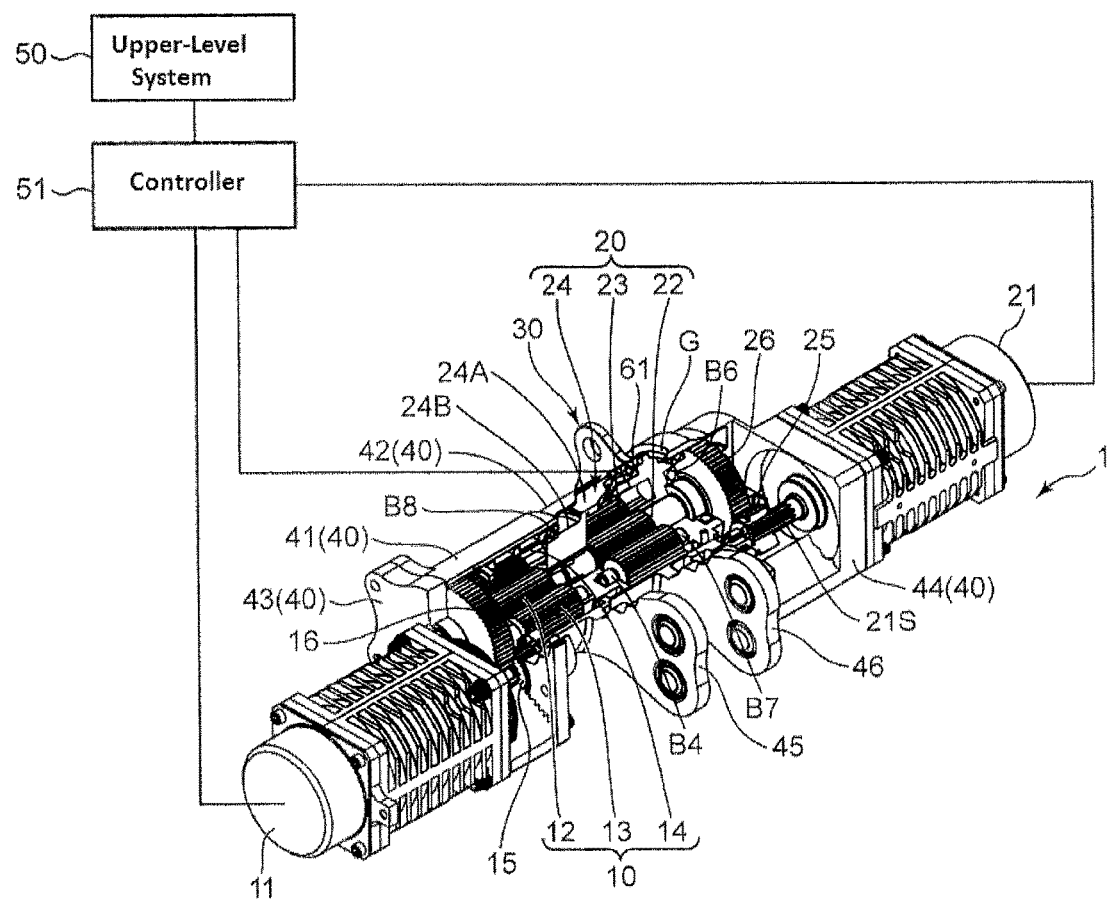
FIG. 4 is a perspective view of the exemplary electric actuator. An interior portion of the electric actuator is partially exposed.

Referring to FIGS. 2-4, the electric actuator 1 may include the case 40, the reduction mechanism 10 (a first planetary gear mechanism 10: see FIG. 4), the planetary gear mechanism 20 (a second planetary gear mechanism 20: see FIG. 4), the first motor 11, the second motor 21, the output section 30, and a controller 51 (see FIG. 4).

As shown in FIG. 3, the electric actuator 1 may be installed on an apparatus 2. The apparatus 2 may include an apparatus body 3 and an operating member 4. The electric actuator 1 can move the operating member 4 relative to the apparatus body 3. For example, the case 40 may be attached to the apparatus body 3. In this case, the output section 30 is attached to the operating member 4. Displacement of the output section 30 relative to the case 40 causes displacement of the operating member 4 relative to the apparatus body 3.

For this embodiment, the apparatus 2 may be an aircraft such as an airplane or a helicopter. The apparatus body 3 may be a wing body. The operating member 4 may be a flight control surface (moving wing) operating portion. The operating member 4 may include a control surface 5 forming at least a part of the surface of the operating member 4. When the output section 30 moves relative to the case 40, the angle of the control surface 5 of the control surface operating portion (operating member 4) with respect to the wing body (apparatus body 3) may be changed. The operating member 4 may also be coupled to other portions of the airframe in addition to the output section 30 of the electric actuator 1.

Referring to FIG. 4, the electric actuator 1 according to the embodiment may include the first planetary gear mechanism 10 and the second planetary gear mechanism 20. Accordingly two power transmission paths are provided in the electric actuator 1. Even if jamming occurs in one of the first planetary gear mechanism 10 or the second planetary gear mechanism 20, and the planetary gear becomes unrotatable around the axis thereof, the electric actuator 1 can still rotate the output section 30 (see FIG. 2) continuously with almost no time lag. According to the principle of this embodiment, it is possible to prevent a jammed state of the electric actuator 1 as a whole from happening. The electric actuator 1 may include a speed-summing type planetary gear mechanism (the second planetary gear mechanism 20). Therefore the output section 30 is operated at a high speed when the actuator is normally operated with no jamming. The planetary gear mechanisms 10, 20 will be hereunder described in detail.

Each of the first motor 11 and the second motor 21 may be an electric motor provided as a drive source for producing a drive force in a rotation direction under supply of electric current. In this embodiment, one or both of the first motor 11 and the second motor 21 can reverse the rotation direction thereof (the rotation is possible in forward and reverse directions). The feedback control based on instructions from the controller 51 (see FIG. 4) may be performed on one or both of the first motor 11 and the second motor 21. The first motor 11 and the second motor 21 respectively include various components such as a stator, rotor and the like provided in a housing.

The electric actuator 1 may include a position sensor 61 (FIG. 11) that senses a position of the output section 30. For example, an angle sensor (a rotation angle sensor) can be used as the position sensor 61. The angle sensor can sense a difference in rotation between a rotating object and a non-rotating object. In this embodiment, the angle sensor may sense, for example, a difference in rotation between the rotating output section 30 and a non-rotating object such as the case 40. For instance, various sensors such as a resolver and a rotary encoder can be used as the angle sensor. The principle of the embodiment is not limited to a particular device used as the angle sensor.

The controller 51 illustrated in FIG. 4 controls the operation of the electric actuator 1. The controller 51 may control the rotation of the first motor 11 and the second motor 21 based on an external signal or signals supplied from the position sensor 61 (see FIG. 11) and the like. The controller 51 may not be provided on the electric actuator 1. Alternatively the controller 51 may be provided in an upper-level system 50.

An example of the upper-level system 50 may include a control system provided in the apparatus 2 (see FIG. 3) to which the actuator is provided. Alternatively, other control systems may be used as the upper-level system 50. The upper-level system 50 shown in FIG. 4 may be used as a flight control system (FCS). The controller 51 may include an actuator controller, a motor driver, and a feedback loop. For example, the feedback loop may use a difference between a value indicated by the position sensor 61 (the angle sensor: see FIG. 11) and a value instructed by the upper-level system 50.

Case

Referring to FIG. 2, the case 40 may retain a structure in which the first motor 11, the second motor 21, the first planetary gear mechanism 10 (see FIG. 4), and the second planetary gear mechanism 20 (see FIG. 4) are integrally connected with each other. In this embodiment, the case 40 may form the outer surface of the electric actuator 1.

Figure 5:
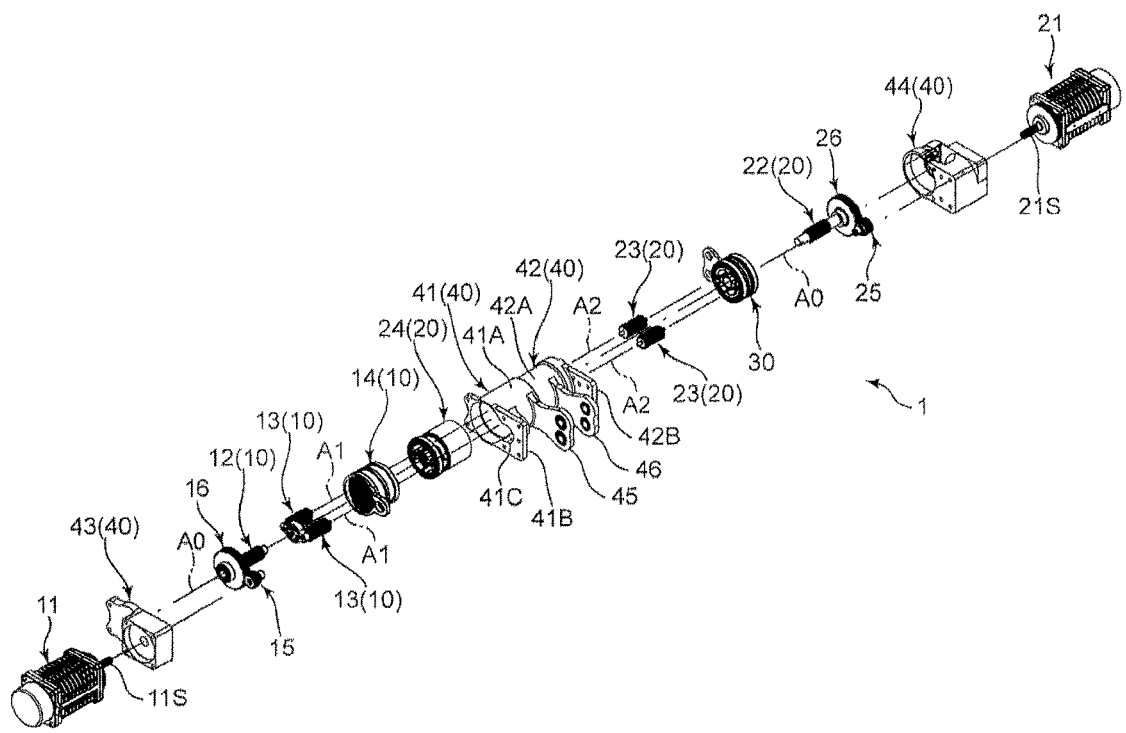
FIG. 5 is an exploded view of the exemplary electric actuator.

Referring to FIGS. 2 and 5, the case 40 of this embodiment may include a first portion 41, a second portion 42, and connection members 43, 44. The first portion 41, the second portion 42, and the connection members 43, 44 may be arranged between the first motor 11 and the second motor 21 along the axial direction of the motors. The first portion 41 and the second portion 42 may form housing spaces in which the first planetary gear mechanism 10 and the second planetary gear mechanism 20 are housed. The connection member 43 may mediate between the first motor 11 and the first portion 41 and connect the first motor 11 to the first portion 41. The connection member 44 may mediate between the second motor 21 and the second portion 42 and connect the second motor 21 to the second portion 42. In this embodiment, the first portion 41 and the second portion 42 may be formed of a single member. Alternatively, the first portion 41 may be formed of a member separate from that of the second portion 42. The connection members 43, 44 may be omitted. In such a case, the first portion 41 may be directly connected to the first motor 11, while the second portion 42 may be directly connected to the second motor 21.

The first portion 41 may include a tubular housing portion 41A that defines a space where the first planetary gear mechanism 10 is provided, and a flange portion 41B that couples the first portion 41 to the connection member 43. A recess 41C may be formed in the first portion 41. A projection 14B (will be described later: see FIG. 8) of the first internal gear 14 is disposed within the recess 41C. The second portion 42 may include a tubular housing portion 42A that defines a space where the second planetary gear mechanism 20 is provided, and a flange portion 42B that couples the second portion 42 to the connection member 44.

More than one insertion hole is provided in the flange portion 41B of the first portion 41. The connection member 43 also has more than one insertion hole. The insertion holes in the connection member 43 are formed at positions corresponding to the insertion holes in the flange portion 41B. Bolts inserted in the insertion holes are screwed into nuts (not shown) provided in the first motor 11. In this way, the first portion 41 is coupled to the first motor 11. In the same manner, more than one insertion hole is provided in the flange portion 42B of the second portion 42. The connection member 44 also has more than one insertion hole. The insertion holes in the connection member 44 are formed at positions corresponding to the insertion holes in the flange portion 42B. Bolts inserted in the insertion holes are screwed into nuts (not shown) provided in the second motor 21. In this way, the second portion 42 is coupled to the second motor 21.

Referring to FIG. 3, the case 40 may be provided with a plurality of brackets (devises) 45, 46. The plurality of brackets (devises) 45, 46 may be used to fix the electric actuator 1 onto the apparatus body 3 of the apparatus 2. The plurality of brackets 45, 46 of this embodiment may be projected in the same direction from the side surface of the case 40. The brackets 45, 46 may have insertion holes into which fixing members (e.g., bolts) are to be inserted. For the example shown in FIG. 3, the brackets 45, 46 may be fixed on the bracket 3A provided on the apparatus body 3. The case 40 may be provided with a single bracket only.

Planetary Gear Mechanisms

Referring to FIG. 4, the first planetary gear mechanism 10 may be the reduction mechanism 10 provided on the output side of the first motor 11. The second planetary gear mechanism 20 may be a reduction mechanism 20 provided on the output side of the second motor 21. As shown in FIGS. 4-11, the first planetary gear mechanism 10 may include the first sun gear 12, a plurality of first planetary gears 13, and the first internal gear 14 (a ring gear 14). The second planetary gear mechanism 20 may include the second sun gear 22, a plurality of second planetary gears 23, and gear member 24. The gear member 24 may include the second internal gear 24A (a ring gear 24A) and the rotational member 24B.

Figure 6:
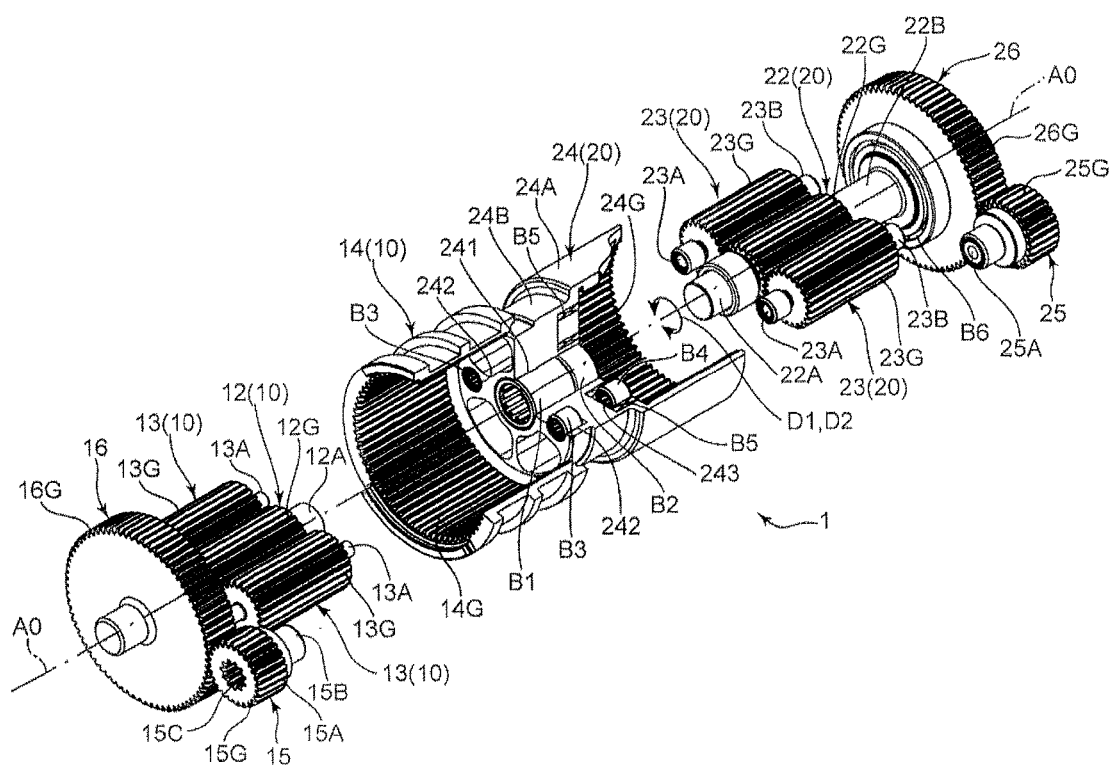
FIG. 6 is an exploded view showing a gear configuration of the exemplary electric actuator.
Figure 7:
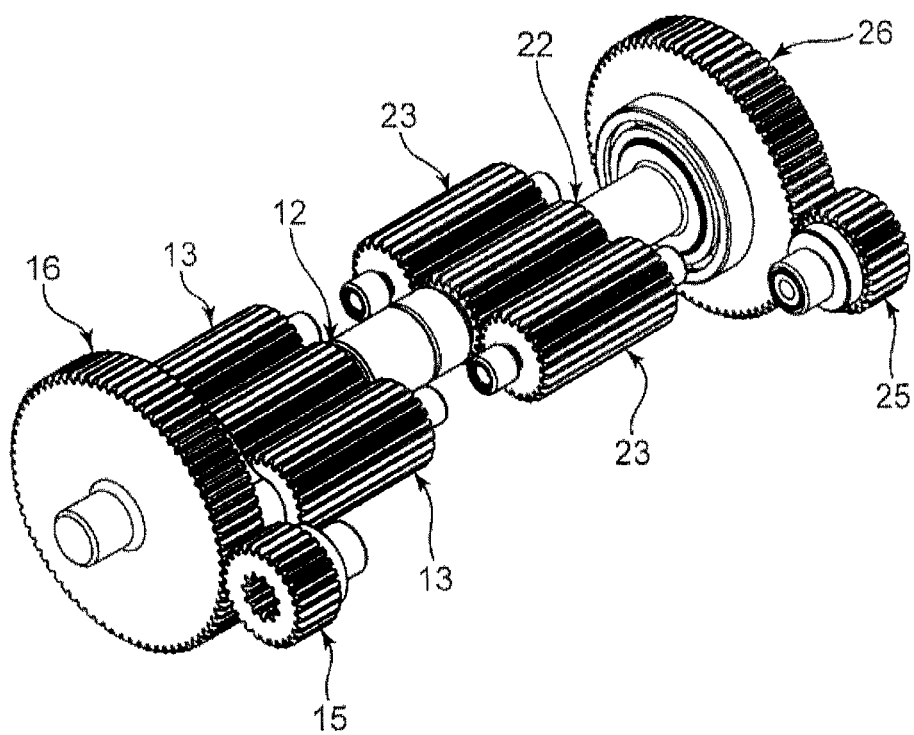
FIG. 7 is a perspective view showing the gear configuration of the exemplary electric actuator.
Figure 11:
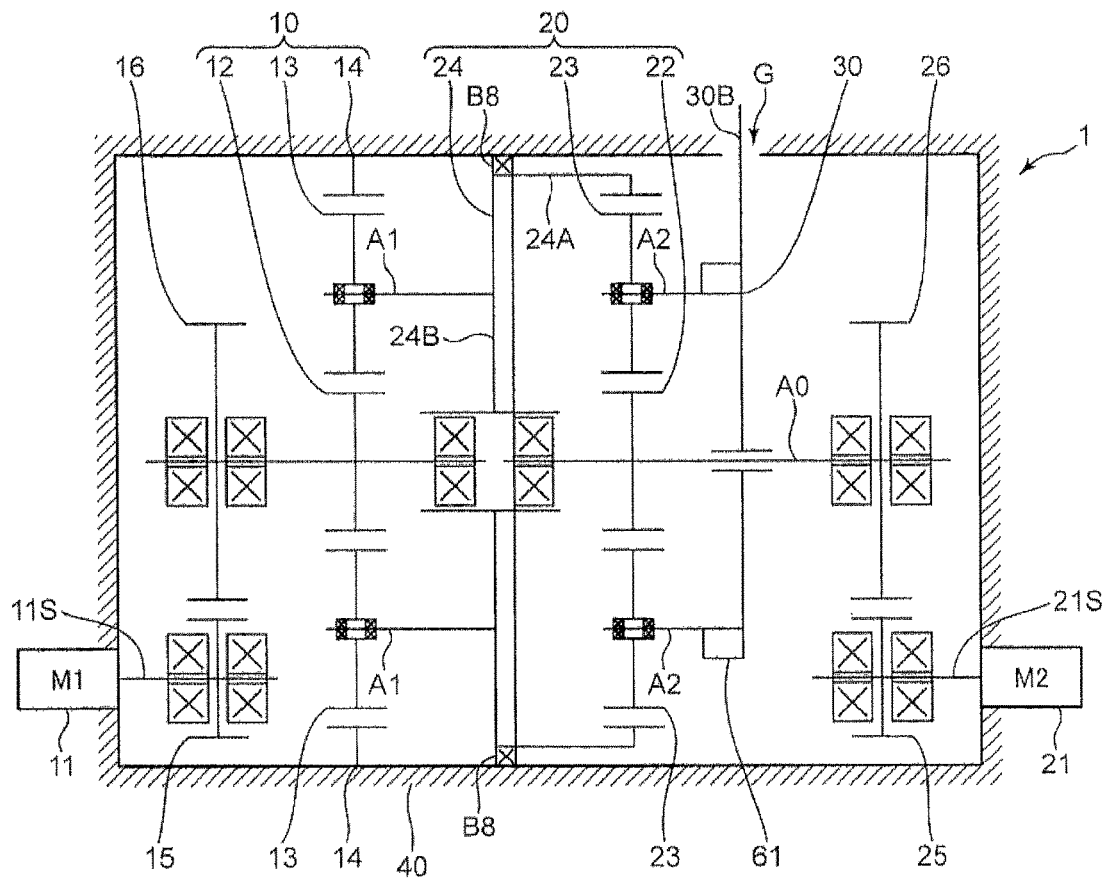
FIG. 11 is a power transmission diagram of the exemplary electric actuator.

In this embodiment, axial centers (the axis A0) of the first sun gear 12, the second sun gear 22, the first internal gear 14, the second internal gear 24A (see FIG. 6), the rotational member 24B (see FIG. 6), and the output section 30 may be arranged concentrically (co-linearly) to each other (situated on the identical line) as shown in FIGS. 5, 6, and 11. Moreover, in the embodiment, the axial center of the revolution of the first planetary gears 13 and the axial center of the revolution of the second planetary gears 23 are arranged concentrically with the axis A0.

In the embodiment, the first planetary gear mechanism 10 may be connected to the first motor 11 via a pinion 15 and a gear wheel 16 having a larger diameter than the pinion 15 as illustrated in FIGS. 1, 5, and 6. The second planetary gear mechanism 20 may be coupled to the second motor 21 via a pinion 25 and a gear wheel 26 having a larger diameter than the pinion 25. The pinion 15 and the gear wheel 16 together serve as a reducer that reduces the output of the first motor 11. The reduced output is transmitted to the first planetary gear mechanism 10. The pinion 25 and the gear wheel 26 together serve as a reducer that reduces the output of the second motor 21. The reduced output is transmitted to the second planetary gear mechanism 20.

A shaft 11S of the first motor 11 may be inserted into a though-hole 15C (see FIG. 6) provided in the pinion 15. A spline (not shown) may be formed on the outer surface of the shaft 11S. A groove may be formed in the inner surface of the through-hole 15C provided in the pinion 15. The spline may be fitted into the groove. External teeth 15G (see FIG. 6) formed on the outer surface of the pinion 15 may mesh with external teeth 16G (see FIG. 6) formed on the outer surface of the gear wheel 16.

A shaft 21S of the second motor 21 may be inserted into a though-hole 25A (see FIG. 6) provided in the pinion 25. A spline (not shown) may be formed on the outer surface of the shaft 21S. A groove (not shown) may be formed in the inner surface of the through-hole 25A provided in the pinion 25. The spline may be fitted into the groove. External teeth 25G (see FIG. 6) formed on the outer surface of the pinion 25 may mesh with external teeth 26G (see FIG. 6) formed on the outer surface of the gear wheel 26.

Referring to FIG. 6, one end of the first sun gear 12 may be inserted through a through-hole (not shown) formed at the center of the gear wheel 16, and the first sun gear 12 may be integrated with the gear wheel 16. As a result, the first sun gear 12 may be rotated in accordance with the rotation of the gear wheel 16. Therefore, the rotation of the shaft 11S (see FIG. 5) of the first motor 11 (see FIG. 5) may be transmitted to the pinion 15 and the gear wheel 16 and then to the first sun gear 12. That is, the first sun gear 12 may be rotated by the first motor 11.

Referring to FIG. 6, one end of the second sun gear 22 may be inserted through a through-hole (not shown) formed at the center of the gear wheel 26, and the second sun gear 22 may be integrated with the gear wheel 26. As a result, the second sun gear 22 may be rotated in accordance with the rotation of the gear wheel 26. Therefore, the rotation of the shaft 21S (see FIG. 5) of the second motor 21 (see FIG. 5) may be transmitted to the pinion 25 and the gear wheel 26 and then to the second sun gear 22. That is, the second sun gear 22 may be rotated by the second motor 21.

The pinion 15 and the gear wheel 16 on the first planetary gear mechanism 10 side may be omitted. In such a case, the shaft 11S of the first motor 11 may be directly connected to the first sun gear 12. Similarly, the pinion 25 and the gear wheel 26 on the second planetary gear mechanism 20 side may be omitted. In such a case, the shaft 21S of the second motor 21 may be directly connected to the second sun gear 22.

Referring to FIGS. 5 and 11, each of the plurality of first planetary gears 13 may rotate on its axis A1 and revolve around the axis A0 of the first sun gear 12. In this embodiment, the first planetary gear mechanism 10 may include two first planetary gears 13. Alternatively, the first planetary gear mechanism 10 may include three or more first planetary gears 13. External teeth 13G (see FIG. 6) formed on the outer circumferential surface of each of the first planetary gears 13 may mesh with external teeth 12G (see FIG. 6) formed on the external circumferential surface of the first sun gear 12.

Referring to FIGS. 5 and 11, each of the plurality of second planetary gears 23 may rotate on its axis A2 and revolve around the axis A0 of the second sun gear 22. In this embodiment, the second planetary gear mechanism 20 may include two second planetary gears 23. Alternatively, the second planetary gear mechanism 20 may include three or more second planetary gears 23. External teeth 23G (see FIG. 6) formed on the outer circumferential surface of each of the second planetary gears 23 may mesh with external teeth 22G (see FIG. 6) formed on the external circumferential surface of the second sun gear 22.

Figure 8:
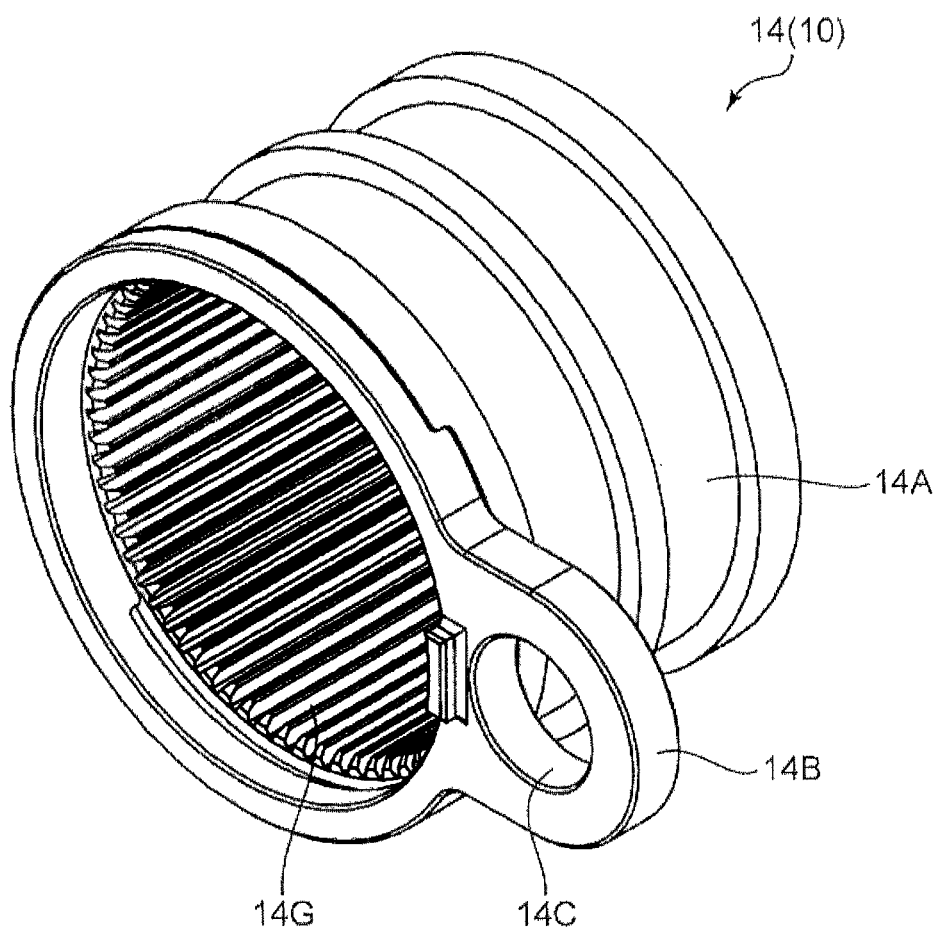
FIG. 8 is a perspective view of a first internal gear in the exemplary electric actuator.

Referring to FIGS. 5, 6, and 8, the first internal gear 14 may be located outside the plurality of first planetary gears 13. In this embodiment, the first internal gear 14 may have a substantially cylindrical shape encircling the plurality of planetary gears 13. The first internal gear 14 may be open at the axially opposite ends. On the inner circumferential surface of the first internal gear 14, there may be formed internal teeth 14G that mesh with the external teeth 13G of the plurality of first planetary gears 13.

The rotation of the first internal gear 14 relative to the case 40 may be restricted. In other words, the first internal gear 14 does not rotate relative to the case 40. For instance, the means illustrated in FIG. 5 can be used as a means for restricting the rotation of the first internal gear 14. The principle of the embodiment will not be limited by a specific means for restricting the rotation of the first internal gear 14.

As for the examples illustrated in FIGS. 5 and 8, the first internal gear 14 may have a cylindrical bearing body 14A and the projection 14B radially projected from the side surface of the bearing body 14A. As described above, the recess 41C is formed in the first portion 41 of the case 40. The projection 14B of the first internal gear 14 is disposed within the recess 41C. The recess 41C may have an inner surface corresponding to the shape of the projection 14B. The projection 14B disposed within the recess 41C restricts the movement of the first internal gear 14 in the circumferential direction. As a result, the rotation of the first internal gear 14 relative to the case 40 is restricted.

Referring to FIG. 8, the projection 14B may have a through-hole 14C formed therein. Referring to FIG. 6, the pinion 15 may include a body 15A with the external teeth 15G, and a cylindrical extending portion 15B that extends along the axial direction from the body 15A toward the projection 14B. The extending portion 15B is inserted in the through-hole 14C of the projection 14B. The shaft 11S of the first motor 11 described above with reference to FIG. 5 may be inserted in the though-hole 15C provided in the pinion 15. The extending portion 15B of the pinion 15 restricts the movement of the first internal gear 14 in the circumferential direction so that the rotation of the first internal gear 14 relative to the case 40 is restricted.

Referring to FIGS. 5, 6, and 9, the second internal gear 24A of the embodiment may be integrally formed with the rotational member 24B to form the gear member 24. Accordingly, the second internal gear 24A rotates in accordance with the rotation of the rotational member 24B in the same direction as the rotational member 24B. Alternatively, the second internal gear 24A may not be formed integrally with the rotational member 24B. Alternatively, the second internal gear 24A may be formed separately from the rotational member 24B. In this case, the second internal gear 24A is coupled to the rotational member 24B.

The second internal gear 24A may mesh with the plurality of second planetary gears 23 and rotate relative to the plurality of second planetary gears 23. The second internal gear 24A may be located outside the plurality of second planetary gears 23. In this embodiment, the second internal gear 24A may have a substantially cylindrical shape encircling the plurality of second planetary gears 23. The second internal gear 24A may be open at the side opposite to the first internal gear 14. On the inner circumferential surface of the second internal gear 24A, there may be formed internal teeth 24G that mesh with the external teeth of the plurality of second planetary gears 23.

The rotational member 24B may be provided between the second internal gear 24A and the first internal gear 14. The rotational member 24B may have a substantially cylindrical shape extending from the second internal gear 24A toward the first internal gear 14. The rotational member 24B may transmit the revolution of the plurality of first planetary gears 13 to the second internal gear 24A.

One end 12A of the first sun gear 12, one end 13A of each of the first planetary gears 13, one end 22A of the second sun gear 22, and one end 23A of each of the second planetary gears 23 are disposed within the rotational member 24B. The rotational member 24B may have a bearing seat 241, bearing seats 242, and a bearing seat 243.

The bearing seat 241 may be provided on the axis A0 of the first sun gear 12 and the second sun gear 22. The bearing B1 supporting the one end 12A of the first sun gear 12 and the bearing B2 supporting the one end 22A of the second sun gear 22 may be placed on the bearing seat 241. In this embodiment, the bearing seat 241 may be formed of a member having a through-hole extending through the rotational member 24B in the direction of the axis A0. Alternatively, a portion of the bearing seat 241 where the bearing B1 is disposed may not be communicated to a portion of the bearing seat 241 where the bearing B2 is disposed.

A bearing (not shown) may be provided on the other end of the first sun gear 12 (the end of the first sun gear 12 on the gear wheel 16 side). The bearing B1 and the bearing provided on the other end of the first sun gear 12 may support the first sun gear 12 and allow the rotation thereof on the axis A0. A bearing B6 may be provided on the other end 22B of the second sun gear 22 (the end 22B of the second sun gear 22 on the gear wheel 26 side). The bearing B6 and the bearing B2 may support the second sun gear 22 and allow the rotation thereof on the axis A0.

The bearing seats 242 may be provided respectively on the axes A1 (see FIG. 5) of the plurality of first planetary gears 13. Bearings B3 that support the one end 13A of the corresponding first planetary gears 13 respectively may be disposed on the bearing seats 242. In this embodiment, each of the bearing seats 242 may be a cavity dented in the end surface of the rotational member 24B toward the first planetary gears 13 along the extending direction of the axes A1. Alternatively, the bearing seats 242 may have other structures.

A bearing (not shown) may be provided on the other end of each of the first planetary gears 13 (the end of each of the first planetary gears 13 on the gear wheel 16 side). The bearing B3 and the bearing provided on the other end of each of the first planetary gears 13 may support the first planetary gear 13 and allow the rotation of each of the first planetary gears 13 about the axis A1 (see FIG. 5).

The bearings B3 may be fitted in the bearing seats 242 (cavities 242). The bearings B3 restrict displacement of each of the first planetary gears 13 in the circumferential direction with respect to the rotational member 24B. When the plurality of first planetary gears 13 revolve around the axis A0 of the first sun gear 12, the rotational member 24B may also rotate on the axis A0 in accordance with the revolution of the plurality of first planetary gears 13. The rotational member 24B is integrally formed with the second internal gear 24A. Therefore, when the rotational member 24B rotates on the axis A0, the second internal gear 24A also rotates on the axis A0. In this manner, the rotational member 24B can transmit the revolution of the plurality of first planetary gears 13 to the second internal gear 24A.

The bearing seats 243 may be provided respectively on the axes A2 (see FIG. 5) of the plurality of second planetary gears 23. The bearings B4 may be fitted in the bearing seats 243. The bearings B4 support the one ends 23A of the corresponding second planetary gears 23. In this embodiment, the bearing seats 243 may be cavities dented in the end surface of the rotational member 24B toward the second planetary gears 23 along the extending direction of the axes A2. Alternatively, the bearing seats 243 may have other structures.

As shown in FIG. 6, the one end 23A of the each of the second planetary gears 23 (that is, the bearing B4 through which the one end 23A of each second planetary gear 23 is inserted) may be supported by the bearing B5 provided on the rotational member 24B. The bearing B5 may allow the rotation of the one end 23A of each of the second planetary gears 23 relative to the rotational member 24B. As a result, with the external teeth 23G of the plurality of second planetary gears 23 meshing with the external teeth 22G of the second sun gear 22 and the internal teeth 24G of the second internal gear 24, the plurality of second planetary gears 23 can revolve around the axis A0 of the second sun gear 22. The plurality of second planetary gears 23 can rotate relative to the second internal gear 24.

The other end 23B of the each of the second planetary gears 23 (the end 23B of each of the second planetary gears 23 on the gear wheel 26 side) may be supported by the bearing B7 (see FIG. 4) provided on the output section 30 which is further discussed below. More specifically, the bearing B7 and the bearing B4 may support each of the second planetary gear 23 and allow the rotation thereof on the axis A2.

Referring to FIG. 4, the electric actuator 1 may include the bearing B8 provided between the case 40 and the second internal gear 24. The rotational member 24B (see FIG. 6) of the gear member 24 (see FIG. 6) is supported by the bearing B8. The bearing B8 may allow the rotation of the rotational member 24B relative to the case 40. The second internal gear 24A and the rotational member 24B of the gear member 24 rotates at the same speed in accordance with the revolution of the plurality of first planetary gears 13 around the axis A0 of the first sun gear 12.

Output Section

Figure 10:
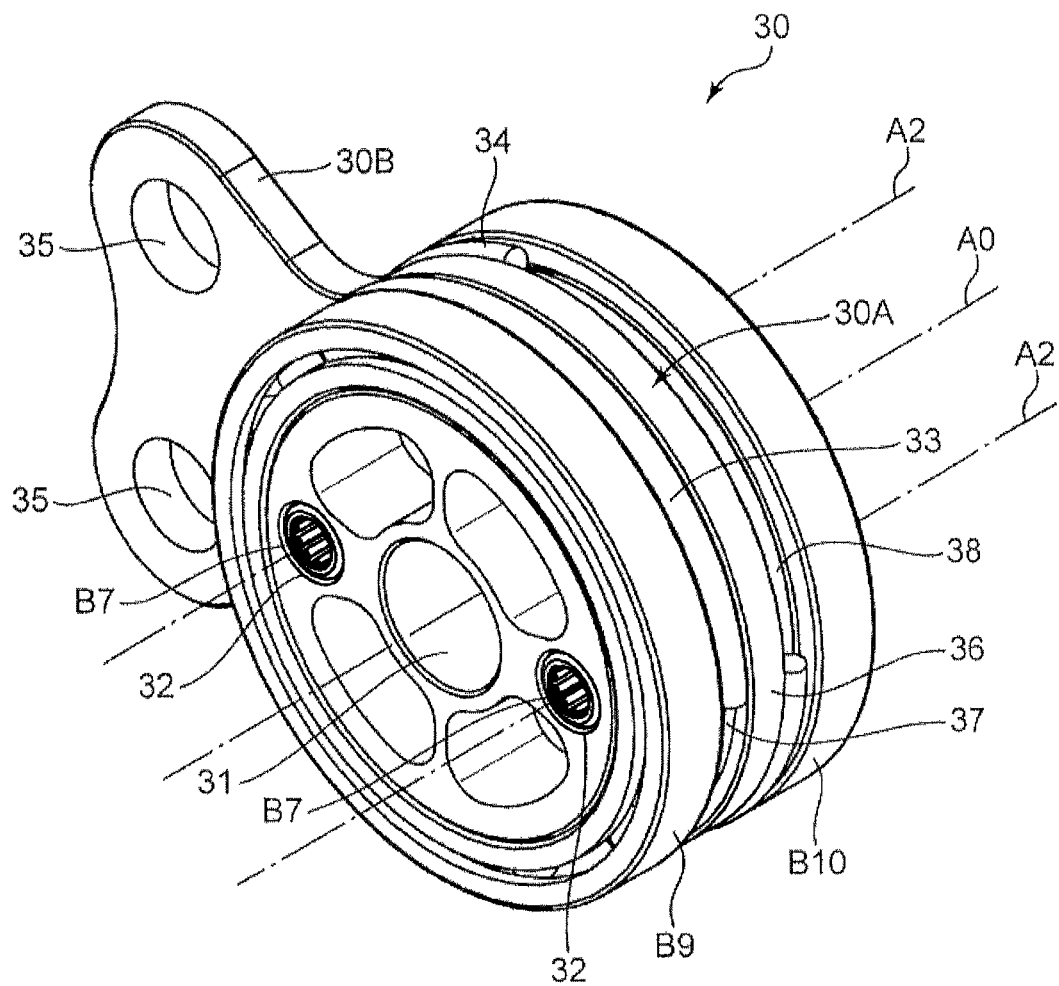
FIG. 10 is a perspective view of an output section of the exemplary electric actuator.

The output section 30 illustrated in FIGS. 4, 5, and 10 may rotate in accordance with the revolution of the plurality of second planetary gears 23 around the axis of the second sun gear 22. In the example shown in FIGS. 4, 5, and 10, the output section 30 may include a body 30A located in the case 40 and an extending portion 30B that extends radially outward from the outer circumferential surface of the body 30A. A part or the entirety of the extending portion 30B may be projected outside the case 40 through the groove G (see FIGS. 2 and 11) provided in the case 40. Since the groove G in the case 40 extends longer than the region of rotation of the output section 30, the case 40 does not restrict rotation of the extending portion 30B.

The body 30A of the output section 30 illustrated in FIG. 10 may be disposed between the second internal gear 24A (see FIG. 6) and the gear wheel 26 (see FIG. 6). The body 30A of this embodiment may have a substantially cylindrical shape. The body 30A may have a through-hole 31 through which the other end 22B (see FIG. 6) of the second sun gear 22 (see FIG. 6) may be inserted.

Bearings B9, B10 illustrated in FIG. 10 may be disposed between the output section 30 and the case 40 (see FIG. 2). The bearings B9, B10 support the body 30A of the output section 30. The bearings B9, B10 may allow the rotation of the body 30A relative to the case 40. The bearing B9 may be disposed in the output section 30 on the side closer to the second internal gear 24A (see FIG. 6) along the extended direction of the axial A0. Whereas the bearing B10 may be disposed in the output section 30 on the side closer to the gear wheel 26 along the extended direction of the axial A0. In this embodiment, the bearings B9, B10 may be ball bearings. Alternatively, other types of bearing components may be used as the bearings B9, B10.

Referring to FIG. 10, the body 30A of the output section 30 may have a large diameter portion 36 at substantially the center of the body 30A along the extended direction of the axis A0. The body 30A of the output section 30 may further have a small diameter portion 37 at a position closer to the second internal gear 24A with respect to the large diameter portion 36. The body 30A of the output section 30 may further have a small diameter portion 38 at a position closer to the gear wheel 26 with respect to the large diameter portion 36. The outer diameter of the large diameter portion 36 is larger than the outer diameters of the small diameter portions 37, 38. The body 30A may have a predetermined outer diameter with respect to the extended direction of the axis A0.

The bearing B9 is provided on the small diameter portion 37. The bearing B10 is provided on the small diameter portion 38. A gap extending in the extended direction of the axis A0 may be provided between the bearing B9 and the large diameter portion 36. A spacer 33 is disposed in the gap. In the same manner, another gap extending in the extended direction of the axis A0 may be provided between the bearing B10 and the large diameter portion 36. A spacer 34 is disposed in the gap.

Referring to FIG. 10, the extending portion 30B of this embodiment may have a plate-like body. Alternatively, the extending portion 30B may have other shapes (for instance, a rod shape). Through-holes 35 for fixing the operating member 4 (see FIG. 3) to the apparatus 2 (see FIG. 3) on which the actuator is mounted may be provided in the extending portion 30B situated outside the case 40. For instance, a bolt (not shown) is inserted in the through-hole 35. The bolt is screwed in the operating member 4. The extending portion 30B of this embodiment may radially protrude out from a portion of the outer circumferential surface of the large diameter 36. Alternatively, the extending portion 30B may protrude out from the outer circumferential surface of the body 30A in a different direction.

The other end 23B of each of the second planetary gears 23 described above with reference to FIG. 6 may be located in the body 30A of the output section 30. Referring again to FIG. 10, the body 30A may have bearing seats 32. The bearing seats 32 may be provided on the axes A2 of the plurality of second planetary gears 23 respectively. Bearings B7 that support the other end 23B of the corresponding second planetary gears 23 may be placed on the bearing seats 32. In this embodiment, the bearing seats 32 may be cavities dented in an end surface of the body 30A on the second planetary gears 24 side in the extending direction of the axes A2.

As described above with reference to FIG. 6, the one end 23A of each of the second planetary gears 23 may be supported by the bearing B4 provided on the rotational member 24B of the gear member 24. The bearing B4 and the bearing B7 (see FIG. 4) may support each of the second planetary gears 23 and allow the rotation thereof on the axis A2.

Operation

An example of the operation of the electric actuator 1 will now be described with reference to FIGS. 4, 6, and 11.

Normal Operation

When the first motor 11 of the electric actuator 1 operates in response to an instruction from the controller 51, the pinion 15 fixed on the shaft 11S may rotate. Simultaneously, the gear wheel 16, which has the external teeth 16G meshing with the external teeth 15G of the pinion 15, may also rotate. When the gear wheel 16 rotates, the first sun gear 12 fixed on the gear wheel 16 may also rotate on the axis A0 thereof. Simultaneously, the plurality of first planetary gears 13, which have the external teeth 13G meshing with the external teeth 12G of the first sun gear 12, may rotate on the axis A1. The first internal gear 14 is fixed and does not rotate with respect to the case 40 so that the plurality of first planetary gears 13 rotate on the axis A1 and revolve around the axis A0 of the first sun gear 12 while meshing with the internal teeth 14G of the first internal gear 14.

When the first planetary gears 13 revolve around the axis A0 of the first sun gear 12, the rotational member 24B of the gear member 24 to which one ends 13A of the plurality of first planetary gears 13 are coupled rotates on the axis A0 at the same speed (the speed of the revolution around the axis A0) and in the same direction (the direction of the revolution around the axis A0) as the plurality of first planetary gears 13. Therefore, the second internal gear 24A formed integrally with the rotational member 24B may also rotate on the axis A0 at the same speed and in the same direction D1.

The rotation of the second internal gear 24A on the axis A0 may cause the plurality of second planetary gears 23 having the external teeth 23G meshing with the internal teeth 24G of the second internal gear 24A to rotate in the same direction D1.

When the second motor 21 operates based on instructions from the controller 51, the pinion 25 fixed on the shaft 21S may rotate. As a result, the gear wheel 26 having the external teeth 26G meshing with the external teeth 25G of the pinion 25 may also rotate. When the gear wheel 26 rotates, the second sun gear 22 fixed on the gear wheel 26 may also rotate on the axis A0 thereof. The plurality of second planetary gears 23 having the external teeth 23G meshing with the external teeth 22G of the second sun gear 22 may rotate on the respective axes A2 and revolve around the axis A0 of the second sun gear 22 in the rotational direction D2, while meshing with the internal teeth 24G of the second internal gear 24A.

If the rotational direction D1, in which the first motor 11 rotates the second internal gear 24A, is the same as the rotational direction D2, in which the second motor 21 rotates the plurality of second planetary gears 23 on the axis A0, the rotational speed (rotational rate) by the first motor 11 and the rotational speed (rotational rate) by the second motor 21 may be added together for so-called speed summing. Such speed summing may enable the output section 30 to rotate at a higher speed than ones in the conventional art without speed summing. In this embodiment, the torque of rotation is not summed up by the speed summing.

If the rotational direction D1, in which the first motor 11 rotates the second internal gear 24A, is counter to the rotational direction D2, in which the second motor 21 rotates the plurality of second planetary gears 23 on the axis A0, the above-mentioned speed summing does not occur. In this case, one of the first motor 11 or the second motor 21 may brake the rotation of the other. For instance, the control example in which a load is high illustrated in FIG. 14 may be realized with the above-described motor operation. The above-described motor operation may also be applied to other controls.

The position sensor 61 may detect that the output section 30 rotates to a predetermined position and may generate a detection signal indicating the rotation of the output section 30. When the detection signal is supplied from the position sensor 61 to the controller 51, the first motor 11 and the second motor 21 stop operating under the instruction by the controller 51. As a result, the operating member 4 may be located at a desired position.

Operation in a Case of Failure

The operation of the electric actuator 1 will be described in the case where one of the first planetary gears 13 or the second planetary gears 23 is unable to rotate on the axis thereof.

The external teeth 13G of the plurality of first planetary gears 13 mesh with the internal teeth 14G of the first internal gear 14 that is restrained from rotating. Therefore, when the first planetary gears 13 are unable to rotate on the axes A1, the first planetary gears 13 cannot revolve around the axis A0 of the first sun gear 12. As a result, the first planetary gears 13 cannot cause the gear member 24 (the rotational member 24B and the second internal gear 24A) to rotate. Whereas the plurality of second planetary gears 23 can revolve around the axis A0 of the second sun gear 22, the output section 30 can continue to rotate in accordance with the revolution of the plurality of second planetary gears 23. That is, even immediately after jamming has occurred in the first planetary gears 13, the output section 30 can rotate continuously without being hindered by the jamming in the first planetary gears 13 and with almost no time lag.

When the second planetary gears 23 are unable to rotate on the axes A2, the plurality of second planetary gears 23 cannot revolve around the axis A0 of the second sun gear 22 while rotating on the respective axes A2. However, the plurality of second planetary gears 23 can revolve around the axis A0 of the second sun gear 22 along with the second internal gear 24A without changing the meshing position with the external teeth 22G of the second sun gear 22 and the meshing position with the internal teeth 24G of the second internal gear 24A. Therefore, the output section 30 can continuously rotate in accordance with the revolution of the plurality of second planetary gears 23. That is, even immediately after the jamming in the plurality of second planetary gears 23, the output section 30 can rotate continuously without being hindered by the jamming in the second planetary gears 23 and with almost no time lag.

Control Example 1 in a Case of Failure

When jamming occurs either one of the planetary gear mechanisms, the motors may be controlled, for example, in the manner described below.

Figure 12:
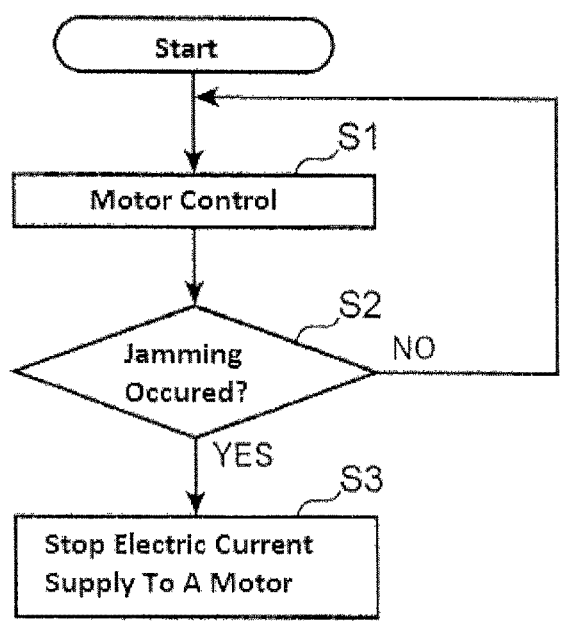
FIG. 12 is a flow chart showing Control Example 1 of the exemplary electric actuator.

FIG. 12 is a flow chart showing Control Example 1 of the exemplary electric actuator 1. As for Control Example 1, when either one of the first planetary gears 13 or the second planetary gears 23 becomes unable to rotate on its axis, the controller 51 may control a power source such that it stops supplying electric current to the first motor 11 and the second motor 21.

Referring to FIG. 12, during normal operation in which no jamming occurs in any of the planetary gear mechanisms, the controller 51 may supply electric current to the first motor 11 and the second motor 21 based on an external signal and a signal supplied from the positional sensor 61 to control the rotations of the first motor 11 and the second motor 21 (step S1).

When the controller 51 received a signal indicating that jamming has occurred in either one of the planetary gear mechanisms (for instance, a signal provided by the position sensor 61, a signal indicating an electric current value) (Yes in step S2), the controller 51 stops supplying electric current to the first motor 11 and the second motor 21 (step S3). Whereas when the controller 51 does not receive the signal indicating that jamming has occurred in either one of the planetary gear mechanisms (No in step S2), the controller 51 may continue the control of the first motor 11 and the second motor 21 (step S1).

In Control Example 1, when the electric current supply to the first motor 11 and the second motor 21 has stopped, the first motor 11 and the second motor 21 can rotate freely. Therefore the plurality of second planetary gears 23 can revolve around the axis A0 of the second sun gear 22 in accordance with the rotation of the second sun gear 22. Therefore, the output section 30 can continuously rotate in accordance with the revolution of the plurality of second planetary gears 23.

Even when the second planetary gears 23 become unable to rotate on the axis A2 due to jamming, the plurality of the second planetary gears 23 can revolve around the axis A0 of the second sun gear 22 without changing the meshing position with the external teeth 22G of the second sun gear 22 and the meshing position with the internal teeth 24G of the second internal gear 24A. Therefore, the output section 30 can continuously rotate in accordance with the revolution of the plurality of second planetary gears 23.

When either one of the first planetary gears 13 or the second planetary gears 23 is unable to rotate on their axes and no electric current is supplied to the first motor 11 and the second motor 21, the output section 30 can be rotated freely by an external force without withstanding the external force such as gravity and a force of wind. The output section 30 can also become freely-rotatable by a manual operation. Therefore, it is possible to prevent the output section 30 from being situated at an inappropriate position. According to the above described Control Example 1, the external force causes the output section 30 to rotate freely so that the supply of the electric current to the first motor 11 and the second motor 21 can be stopped, resulting in reduction in wasteful power consumption.

Control Example 2 in a Case of Failure

Figure 13:
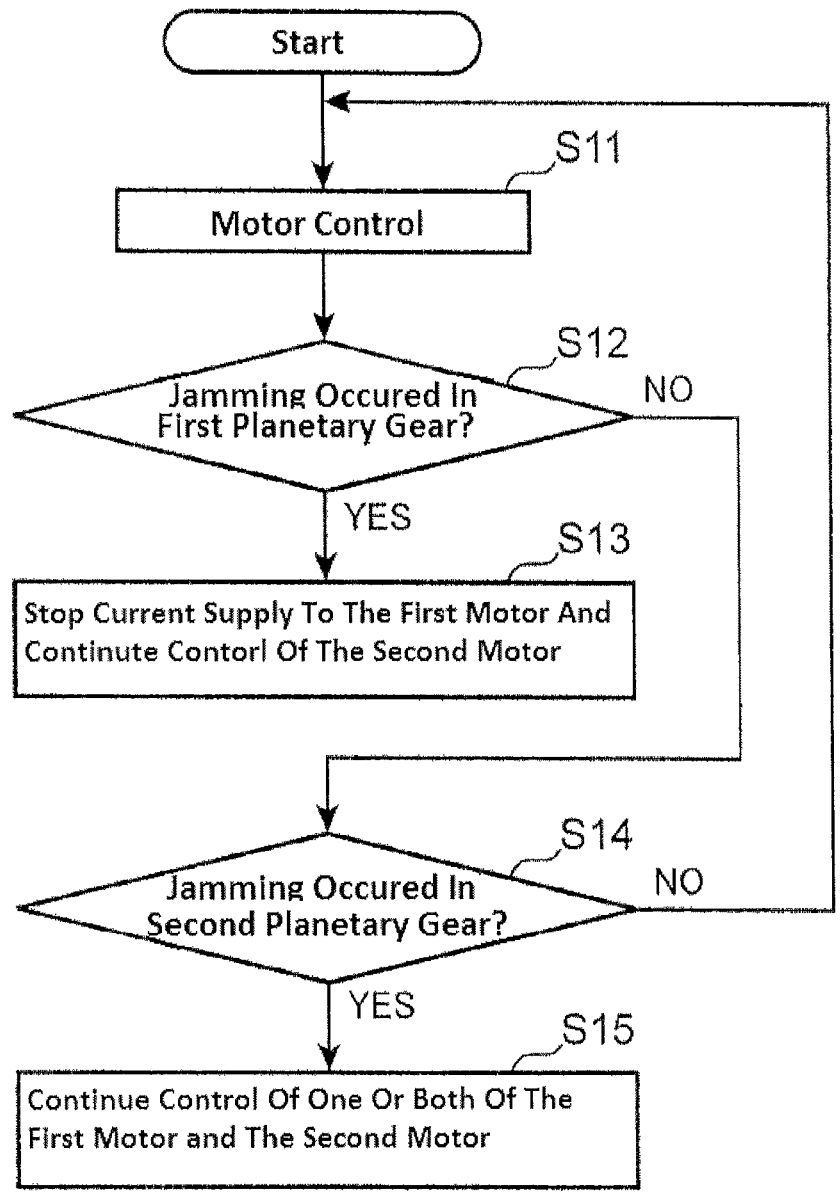
FIG. 13 is a flow chart showing Control Example 2 of the exemplary electric actuator.

FIG. 13 is a flow chart showing Control Example 2 of the exemplary electric actuator 1. In Control Example 2, when the first planetary gears 13 become unable to rotate on the axes A1, the controller 51 may stop supplying electric current to the first motor 11 and control a power supply, a motor and the like such that the second sun gear 22 is rotated by the second motor 21. In Control Example 2, the output section 30 is placed at an appropriate position even when the first planetary gears 13 become unable to rotate on the axes A1. Moreover, Control Example 2 contributes to reduction in wasteful power consumption.

Referring to FIG. 13, during normal operation in which no jamming occurs in any of the planetary gear mechanisms, the controller 51 may supply electric current to the first motor 11 and the second motor 21 based on an external signal and a signal supplied from the positional sensor 61 to control the rotations of the first motor 11 and the second motor 21 (step S11).

When the controller 51 received a signal indicating that jamming occurs in the first planetary gear mechanism 10 (Yes in Step S12), the controller 51 stops supplying electric current to the first motor 11 while maintaining the control of the second motor 21 (step S13).

Even when the first planetary gears 13 become unable to rotate on the axes A1 due to jamming in the first planetary gear mechanism 10, the plurality of second planetary gears 23 cannot revolve around the axis A0 of the second sun gear 22 in accordance with the rotation of the second sun gear 22. Therefore, when the second sun gear 22 is rotated by the second motor 21, the plurality of second planetary gears 23 cannot revolve around the axis A0 of the second sun gear 22. Therefore, the output section 30 can continuously rotate in accordance with the revolution of the plurality of second planetary gears 23. Consequently, the output section 30 can be placed at an appropriate position. Therefore, when the first planetary gears 13 are unable to rotate on the axes A1, the first planetary gears 13 cannot revolve around the axis A0 of the first sun gear 12. Accordingly, the first sun gear 12 cannot also rotate on the axis A0. Even if electric current is supplied to the first motor 11, the first sun gear 12 does not rotate so that the supply of the electric current to the first motor 11 can be stopped, resulting in reduction in wasteful power consumption.

When the controller 51 does not receive a signal indicating that jamming occurs in the first planetary gear mechanism 10 (No in step S12), a control of step S14 is executed.

When the controller 51 received a signal indicating that jamming occurs in the second planetary gear mechanism 20 (Yes in Step S14), the controller 51 continues controlling of either or both of the first motor 11 and the second motor 21 (step S15).

Even when the second planetary gears 23 become unable to rotate on the axis A2 due to jamming in the second planetary gear mechanism 20, the plurality of the second planetary gears 23 can revolve around the axis A0 of the second sun gear 22 without changing the meshing position with the external teeth 22G of the second sun gear 22 and the meshing position with the internal teeth 24G of the second internal gear 24A. There are two power transmission paths that cause the second planetary gears 23 to revolve. In one power transmission path, a drive force generated by the first motor 11 is transmitted to the first sun gear 12, the first planetary gears 13, the rotational member 24B, and the second internal gear 24A in the stated order. As a result, the second internal gear 24A is rotated. Therefore the plurality of second planetary gears 23 can revolve around the axis A0 of the second sun gear 22 in accordance with the rotation of the second internal gear 24A. In another power transmission path, a drive force generated by the second motor 21 is transmitted to the second sun gear 22. As a result, the second sun gear 22 is rotated. Therefore the plurality of second planetary gears 23 can revolve around the axis A0 of the second sun gear 22 in accordance with the rotation of the second sun gear 22.

Even when the second planetary gears 23 become unrotatable on the axes A2, the revolution of the second planetary gears 23 can caused by various methods. For instance, the plurality of second planetary gears 23 may be revolved via the first motor 11 that rotates the first sun gear 12. Alternatively, the plurality of second planetary gears 23 may be revolved via the second motor 21 that rotates the second sun gear 22. Alternatively, the plurality of second planetary gears 23 may be revolved via the first and second motors 11, 21 that rotate the first and second sun gears 12, 22 respectively. Because the output section 30 can be rotated in accordance with the plurality of second planetary gears 23, the output section 30 can be placed at an appropriate position.

Whereas when the controller 51 does not receive the signal indicating that jamming has occurred in the second planetary gear mechanism 20 (No in step S14), the controller 51 may continue the control of the first motor 11 and the second motor 21 (step S11).

Control Example in a Case of High Load

Figure 14:
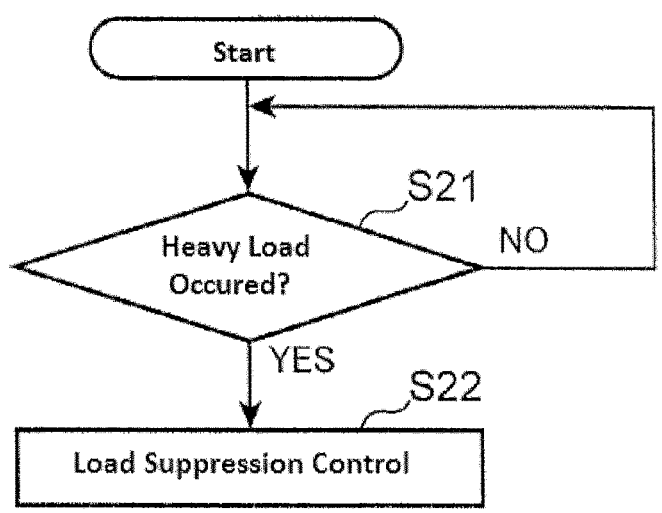
FIG. 14 is a flow chart showing Control Example 3 of the exemplary electric actuator.

FIG. 14 is a flow chart showing Control Example 3 of the exemplary electric actuator 1. In Control Example 3, one of the first motor 11 or the second motor 21 is controlled such that the output section 30 is rotated in one direction. The other of the first motor 11 and the second motor 21 is controlled such that its force acts on the output section 30 in the opposite direction.

In the case where the motors are controlled such that the output section 30 is rotated either in one or the other direction, when the controller 51 received a signal indicating that an external force in one direction (for example, an external force generated by a stream of air) larger than a prescribed reference value is applied to the output section 30 or the operating member 4 coupled to the output section 30 (Yes in step S21), the controller 51 controls one of the first motor 11 or the second motor 21 such that the output section 30 is rotated in one direction, and performs a load suppression control on the other of the first motor 11 or the second motor 21 such that a force acts on the output section 30 in the direction opposite to the one direction (step S22).

In Control Example 3, one motor is controlled such that the output section 30 is rotated in one direction and the other motor is controlled such that a force generated by the motor acts on the output section 30 in the opposite direction. When the one motor is powered on, a force generated by the motor acts on the output section 30 and the output section 30 rotates in one direction. The other motor is also powered on and the output section 30 receives an opposite force. Consequently, an external force is less likely to cause the output section 30 and the operating member 4 to rotate at an excessively high speed so that loads on the output section 30 and the operating member 4 can be reduced.

Summary of the Embodiment

According to the embodiment, the electric actuator 1 may include the first planetary gear mechanism 10 and the second planetary gear mechanism 20. The first planetary gear mechanism 10 may include the first sun gear 12, the plurality of first planetary gears 13, and the first internal gear 14. The second planetary gear mechanism 20 may include the second sun gear 22, the plurality of second planetary gears 23, the rotational member 24B, and the second internal gear 24A. The rotation of the first internal gear 14 may be restricted. The rotational member 24B and the second internal gear 24A rotate in accordance with the revolution of the plurality of first planetary gears 13 meshing with the internal teeth of the first internal gear 14. In this way, even if jamming occurs in one of the planetary gear mechanisms and the planetary gear becomes unrotatable around the axis thereof, the electric actuator 1 can still rotate the output section 30 with almost no time lag. Therefore the electric actuator 1 is highly reliable. In the embodiment, the output section 30 is operated at a high speed by so-called speed summing during a normal operation in which no jamming occur.

The plurality of first planetary gears 13 mesh with the internal teeth of the first internal gear 14 that is restricted from rotating. Therefore, when the first planetary gear 13 is unable to rotate on the axis A1, the first planetary gears 13 cannot revolve around the axis A0 of the first sun gear 12. Consequently, the rotational member 24B and the second internal gear 24A do not rotate. Whereas the plurality of second planetary gears 23 in which no jamming occurs can revolve around the axis of the second sun gear 22, the output section 30 can continue to rotate in accordance with the revolution of the plurality of second planetary gears 23. That is, even immediately after jamming has occurred in the first planetary gears 13, the output section 30 can rotate continuously without being hindered by the jamming in the first planetary gears 13 and with almost no time lag.

When the second planetary gear 23 is unable to rotate on its axis, the plurality of second planetary gears 23 cannot rotate on their axes and cannot revolve around the axis of the second sun gear 22. However, the second planetary gears 23 can revolve around the axis of the second sun gear 22 along with the second internal gear 24A without changing the meshing position with the second sun gear 22 and the meshing position with the second internal teeth 24A. Therefore, the output section 30 can continuously rotate in accordance with the revolution of the plurality of second planetary gears 23. Even immediately after jamming has occurred in the second planetary gears 23, the output section 30 can rotate continuously without being hindered by the jamming in the second planetary gears 23 and with almost no time lag.

The drive force generated by the first motor 11 is transmitted to the first sun gear 12, the first planetary gears 13, the rotational member 24B, and the second internal gear 24A in the stated order. As a result, the second internal gear 24A is rotated. The plurality of second planetary gears 23 meshing with the internal teeth 24G of the second internal gear 24A may revolve around the axis A0 of the second sun gear 22 along with the second internal gear 24A in accordance with the rotation of the second internal gear 24A. On the other hand, the drive force provided by the second motor 21 may be transmitted sequentially to the second sun gear 22 and the second planetary gears 23. As a result, each of the second planetary gears 23 rotates on the respective axes of the second planetary gears 23. At the same time, the plurality of second planetary gears 23 can revolve around the axis A0 of the second sun gear 22. That is, the second planetary gears 23 can rotate at a rotation speed produced by adding together the revolution speed in accordance with the rotation of the second internal gear 24A by the first motor 11 and the revolution speed by the second motor 21 (at a rotation speed produced by speed summing). Accordingly, the output section 30 that rotates in accordance with the revolution of the second planetary gears 23 rotate at a rotation speed produced by speed summing; therefore, the output section 30 can operate at a higher speed than in the conventional art without speed summing.

In the embodiment, the two power transmission paths are formed as a result of use of the speed-summing type planetary gear mechanism. Therefore even when jamming occurs in one of the two paths, the other path is available, which ensures the rotation. This means that jamming in the electric actuator as a whole is prevented. The operating member 4 may be controlled by the motor in which no jamming occurs. The size of a driving structure equipped with two motors is largely affected by the diameter of the motors compared to a driving structure with one motor so a smaller diameter of the motor is preferable. The electric actuator 1 having the small sized motors according to the embodiment is adequately housed within a storage space having a flat wind configuration.

If jamming in any of the planetary gear mechanism causes an external load exceeding a rated power of a normally-operating motor (a load exceeding a rated electric capacity), the output section 30 is immediately back-driven automatically in the direction of the load. In this manner, the load of the electric actuator 1 and the load of the apparatus coupled to the electric actuator 1 are reduced. As for an electric actuator in which a jack screw, a mechanical separation may be required for releasing jamming when the jamming occurs in the jack screw. Consequently, a delay in the separation (for example, about 30 milliseconds delay) may occur. The delay in the separation may contribute to the immediate failure of back-drive.

Whereas the principle of the embodiment does not require a clutch mechanism, a share pin mechanism and the like unlike the conventional actuators. Therefore the weight of the electric actuator 1 can be reduced.

The electric actuator 1 according to the embodiment may include the case 40 that houses the first internal gear 14 and the rotational member 24B, and the bearing B8 disposed between the case 40 and the rotational member 24B. As a result, the rotation of the first internal gear 14 relative to the case 40 is restricted. The rotational member 24B may be rotatably supported by the bearing B8 with respect to the case 40. Therefore the rotational member 24B can be rotated relative to the case 40 and the first internal gear 14 without causing the rotation of the first internal gear 14 relative to the case 40.

As for the second internal gear 24 according to the embodiment, all of the first planetary gears 13 are coupled to the rotational member 24B. Therefore, the second internal gear 24 can continuously rotate in accordance with the revolution of the plurality of first planetary gears 13. All of the second planetary gears 23 are coupled to the output section 30. Therefore, the output section 30 can continuously rotate in accordance with the revolution of the plurality of second planetary gears 23. The principle of the embodiment allows the second internal gear 24A to rotate in accordance with the revolution of the plurality of first planetary gears 13. Therefore, the output section 30 can continuously rotate in accordance with the revolution of the plurality of second planetary gears 23. The first planetary gears 13 according to the embodiment are directly connected to the rotational member 24B without any components intervening therebetween. The second planetary gears 23 according to the embodiment are directly connected to the output section 30 without any components intervening therebetween. These features contribute to reduction in the number of components and simplification of the structure.

Variation

The principle of this embodiment is not limited to the above description or the illustrated structure. Those skilled in the art can make various modifications or improvements within the purport of this embodiment.

In this embodiment, the apparatus body 3 may be a wing body of an aircraft. The operating member 4 may be the flight control surface operating portion (moving wing). Alternatively, the apparatus body 3 may be an airframe of an aircraft. The operating member 4 may be, for example, a door provided on an airframe and capable of opening and closing the doorway.

In this embodiment, the apparatus 2 on which the electric actuator 1 is mounted may be an aircraft. Alternatively, the electric actuator 1 may be mounted on other apparatuses 2 such as ships and ground vehicles.

All of the first planetary gears 13 according to the embodiment are coupled to the rotational member 24B. Therefore, the rotational member 24B is rotated in accordance with the revolution of the plurality of first planetary gears 13. Alternatively, at least one of the first planetary gears 13 may be coupled to the rotational member 24B. The rotational member 24B may rotate in accordance with the revolution of the first planetary gear 13 coupled to the rotational member 24B.

All of the second planetary gears 23 according to the embodiment are coupled to the output section 30. Therefore, the output section 30 is rotated in accordance with the revolution of the plurality of second planetary gears 23. Alternatively, at least one of the second planetary gears 23 may be coupled to the output section 30. Therefore, the output section 30 is rotated in accordance with the revolution of the second planetary gear 23.

In this embodiment, the first planetary gear mechanism 10 may include the plurality of first planetary gears 13. Alternatively, the first planetary gear mechanism 10 may include only one first planetary gear 13.

In this embodiment, the second planetary gear mechanism 20 may include the plurality of second planetary gears 23. Alternatively, the second planetary gear mechanism 20 may include only one second planetary gear 23.

The electric actuator according to the embodiment may include the first motor and the second motor. Alternatively, the electric actuator may not include the first motor and the second motor. The electric actuator may utilize an externally-provided motor. In this case, an reduced output from an externally-provided first motor is transmitted to the output section through the rotational member supported by the bearing and through the internal gear. More specifically, an output from an externally-provided second motor is transmitted to the output section through the planetary gear mechanism that includes the sun gear, the planetary gear, and the internal gear. A drive force provided by the motor is transmitted to the output section through the rotational member supported by the bearing and through the internal gear. Another drive force provided separately from the above-mentioned drive force by the motor may be transmitted to the output section through the sun gear and the internal gear.

The above embodiment may include the following features.

According to one aspect of the embodiment, the electric actuator includes the output section that receives the output from the first motor through the rotational member supported by the bearing and through the internal gear. More specifically, the output section receives the output from the second motor through the planetary gear mechanism that includes the internal gear, the sun gear, and the planetary gear.

With this configuration, the output from the second motor is not transmitted to the output section when jamming occurs. In this case, the reduced output from the first motor is transmitted to the output section through the rotational member and the internal gear. Jamming may hamper the transmission of the output from the first motor to the output section. However the output from the second motor is transmitted to the output section through the planetary gear mechanism that includes the sun gear, the planetary gear, and the internal gear. Therefore even when the jamming occurs, the output section can be continuously rotated.

According to the aspect of the embodiment, the axial centers of the first motor and the rotational member, the axial centers of the second motor and the sun gear, and the axial center of the revolution of the planetary gear may be arranged concentrically.

In this case, the electric actuator includes a path that transmits the output from the first motor to the output section, and another path that transmits the output from the second motor to the output section. The axial centers of the components forming the paths are arranged concentrically to each other so that the radial size of the electric actuator can be reduced. Therefore one aspect of the embodiment can provide a small-sized structure of the electric actuator in addition to the advantage that the electric actuator can continuously rotate the output section even when jamming occurs.

According to the aspect, the electric actuator may include the first sun gear rotated by the first motor, at least one first planetary gear meshing with the first sun gear, and the first internal gear that has internal teeth meshing with the at least one first planetary gear and is restricted from rotating. The sun gear may be the second sun gear rotated by the second motor. The planetary gear may be at least one second planetary gear meshing with the second sun gear. The internal gear may be the second internal gear that has the internal teeth meshing with the at least one second planetary gear. The rotational member may rotate in accordance with revolution of the at least one first planetary gears around the axis of the first sun gear. The second internal gear may rotate in accordance with the rotation of the rotational member. The output section may rotate in accordance with revolution of the at least one second planetary gear around the axis of the second sun gear.

According to the aspect, the electric actuator includes the planetary gear mechanism that includes the first sun gear, the first planetary gear, and the first internal gear. The electric actuator includes the planetary gear mechanism that includes the second sun gear, the second planetary gear, the rotational member, and the second internal gear. The rotation of the first internal gear is restricted. The rotational member rotates in accordance with the revolution of the first planetary gear meshing with the internal teeth of the first internal gear. The second internal gear rotates in accordance with the rotation of the rotational member. Even when jamming occurs in one of the planetary gear mechanisms and the corresponding planetary gear becomes unrotatable on its axis, the output section can be continuously rotated by the motor coupled to the other of the planetary gear mechanisms in which no jamming occurs. When jamming occurs in one of the planetary gear mechanisms, the output section may be freely rotated by an external force (for instance, gravity, a force of wind and the like) working on the output section without operating the motors. Therefore the electric actuator is highly reliable. The output section is operated at a high speed by so-called speed summing during a normal operation in which no jamming occur.

The first planetary gear meshes with the internal teeth of the first internal gear whose rotation is restrained. Therefore, when the first planetary gear is unable to rotate on its axis, the first planetary gear cannot revolve around the axis of the first sun gear. Consequently, the rotational member and the second internal gear do not rotate. Whereas the second planetary gear in which no jamming occurs can revolve around the axis of the second sun gear, so that the output section can continue to rotate in accordance with the revolution of the second planetary gear. Even immediately after jamming has occurred in the first planetary gear, the output section can rotate continuously without being hindered by the jamming and with almost no time lag.

When the second planetary gear is unable to rotate on its axis, the second planetary gear cannot revolve around the axis of the second sun gear while rotating on its axis and. However, the second planetary gear can revolve around the axis of the second sun gear along with the second internal gear without changing the meshing position with the second sun gear and the meshing position with the second internal teeth. In this manner, the output section is allowed to rotate in accordance with the revolution of the second planetary gear. Even immediately after jamming has occurred in the second planetary gear, the output section can rotate continuously without being hindered by the jamming in the second planetary gear and with almost no time lag.

The drive force generated by the first motor is transmitted to the first sun gear, the first planetary gear, the rotational member, and the second internal gear in the stated order. As a result, the second internal gear can rotate. At this point, the second planetary gear 23 meshing with the internal teeth of the second internal gear follows the second internal gear to revolve around the axis of the second sun gear in accordance with the rotation of the second internal gear. On the other hand, the drive force generated by the second motor may be transmitted sequentially to the second sun gear and the second planetary gear. As a result, the second planetary gear can rotate on its axis and also revolve around the axis of the second sun gear. The second planetary gear can rotate at a rotation speed produced by adding together the revolution speed in accordance with the rotation of the second internal gear by the first motor and the revolution speed by the second motor (at a rotation speed produced by speed summing). The output section that rotates in accordance with the revolution of the second planetary gear may rotate at the rotation speed produced by speed summing. Therefore, the output section can operate at a higher speed than in the conventional art without speed summing.

When jamming occurs either one of the planetary gear mechanisms, the motors may be controlled, for example, in the manner described below.

According to the aspect, when the at least one first planetary gear becomes unrotatable on its axis, electric current supply to the first motor is stopped but the second sun gear may be rotated by the second motor.

In this configuration, the output section can be placed at an appropriate position even when the first planetary gear becomes unable to rotate on its axis. Moreover, the electric actuator can save power consumption.

Even when the first planetary gear becomes unrotatable on its axis, the second planetary gear can revolve around the axis of the second sun gear in accordance with the rotation of the second sun gear. When the second motor rotates the second sun gear, the second planetary gear can revolve around the axis of the second sun gear. Therefore, the output section can rotate in accordance with the revolution of the plurality of second planetary gear. Consequently, the output section can be placed at an appropriate position. When the first planetary gear is unable to rotate on its axis, the first planetary gear cannot revolve around the axis of the first sun gear. Accordingly, the first sun gear cannot also rotate on its axis. The first sun gear does not rotate even when the first motor is supplied with electric current. So stopping the supply of electric current to the first motor can save a wasted power consumption.

According to the aspect, when either of the at least one first planetary gear or the at least one second planetary gear becomes unrotatable on its axis, one of the first motor or the second motor corresponds to the unrotatable planetary gear. Electric current supply to the one of the first motor or the second motor is then stopped. The other of the first motor or the second motor rotates the corresponding sun gear.

With this configuration, even when the first planetary gear becomes unrotatable on its axis, the second planetary gear can revolve around the axis of the second sun gear by the second motor that rotates the second sun gear. Consequently, the output section can be placed at an appropriate position. In this case, stopping the supply of the electric current to the first motor can save a wasted power consumption.

In this configuration, the output section can be placed at an appropriate position even when the second planetary gear becomes unrotatable on its axis. Moreover, the electric actuator can save power consumption.

Even when the second planetary gear becomes unrotatable on its axis, the second planetary gear can revolve around the axis of the second sun gear without changing the meshing position with the second sun gear and the meshing position with the second internal teeth. There are two power transmission paths that cause the second planetary gear to revolve. In one power transmission path, a drive force generated by the first motor is transmitted to the first sun gear, the first planetary gear, the rotational member, and the second internal gear in the stated order. As a result, the second internal gear is rotated. Therefore the second planetary gear can revolve around the axis of the second sun gear in accordance with the rotation of the second internal gear. In another power transmission path, a drive force generated by the second motor is transmitted to the second sun gear. As a result, the second sun gear is rotated. Therefore the second planetary gear can revolve around the axis of the second sun gear in accordance with the rotation of the second sun gear.

Even when the second planetary gear becomes unrotatable on its axis, the second planetary gear can revolve by the first motor that rotates the first sun gear. Alternatively, the second planetary gear may be revolved via the second motor that rotates the second sun gear. Alternatively, the second planetary gear may be revolved via both the first and second motors that rotate the first and second sun gears respectively. Therefore, the output section can rotate in accordance with the revolution of the second planetary gear. Consequently, the output section can be placed at an appropriate position.

In the above configuration, one of the first motor or the second motor may be controlled such that the output section rotates in one direction. The other of the first motor or the second motor may be controlled such that a force works on the output section in a direction opposite to the one direction.

According to this configuration, when one of the motors is controlled such that the output section rotates in one direction and an large external force (for instance, an external force generated by a stream of air) works on the output section or the operating member coupled to the output section (for example, a flight control surface operating portion of an aircraft) in one direction, a heavy load may be put on the output section. However the other motor is controlled such that a force works on the output section in the direction opposite to the one direction so that the external force is less likely to cause an excessively high-speed rotations of the output section and the operating member. Therefore loads on the output section and the operating member can be reduced.

In the above configuration, the electric actuator may further include the case housing the first internal gear and the rotational member. The rotation of the first internal gear relative to the case may be restrained. The rotational member may be rotatably supported by the bearing with respect to the case.

With the above configuration, the rotation of the first internal gear relative to the case is restrained. The rotational member may be rotatably supported by the bearing with respect to the case. Therefore the rotational member can be rotated relative to the case and the first internal gear without causing the rotation of the first internal gear relative to the case.

In the above configuration, the coupling of the at least one first planetary gear to the rotational member may cause the rotation of the rotational member in accordance with the revolution of the at least one first planetary gear. The coupling of the at least one second planetary gear to the output section may cause the rotation of the output section in accordance with the revolution of the at least one second planetary gear.

In this configuration, the coupling of the at least one first planetary gear to the rotational member results in the rotation of the rotational member in accordance with the revolution of the first planetary gear. The coupling of the at least one second planetary gear to the output section results in the rotation of the output section in accordance with the revolution of the second planetary gear. The first planetary gear may be directly coupled to the rotational member without any components intervening therebetween. The second planetary gear may be directly coupled to the output section without any components intervening therebetween. The direct couplings contribute to reduction in the number of components and simplification of the structure.

According to another aspect of the embodiment, a gear mechanism includes an output section that receives the drive force supplied thereto through a rotational member supported by a bearing and through an internal gear. The output section receives another drive force supplied thereto other than the above-mentioned drive force through the internal gear, the sun gear, and the planetary gear.

With the above configuration, even when the planetary gear becomes unrotatable on its axis due to jamming, the drive force can be transmitted to the output section through the rotational member and the internal gear. Therefore even when the drive force cannot be transmitted to the output section due to the jamming, another drive force separately supplied can be transmitted to the output section through the sun gear, the planetary gear, and the internal gear. Therefore even when the jamming occurs, the output section can be continuously rotated. During a normal operation in which no jamming occurs, the drive forces separately supplied can be transmitted through two separate power transmission paths so that the output section can be adequately operated (a reducer having two inputs and one output).

What is claimed is:

1. An electric actuator to be mounted on an object having a stationary section and a movable section, the electric actuator for actuating the movable section of the object and comprising:
    a case fixedly attached to the stationary section of the object, the case comprising a wall defining an enclosed space and having an outlet hole therein;
    a first motor configured for generating a first actuating power;
    a second motor configured for generating a second actuating power;
    an output section configured for outputting an actuating power comprising the first actuating power and/or the second actuating power, the output section having an output body provided in the enclosed space and an extending portion projecting outside of the case through the outlet hole and connected with the movable section of the object;
    a position sensor for sensing a position of the output section;
    a controller configured for controlling the first motor and the second motor in accordance with a sensed position of the output section; and
    a gear mechanism provided in the enclosed space of the case, the gear mechanism comprising:
        a rotational member configured to be rotatable about a common axis and connected with the first motor,
        a bearing provided between an inner surface of the wall and an outer surface of the rotational member to rotatably support the rotational member;
        an internal gear formed in the rotational member;
        a sun gear configured to be rotatable about the common axis and connected with the second motor; and
        a planetary gear provided between the internal gear and the sun gear and connected with the output body,
        wherein the rotational member, the internal gear, and the planetary gear define a first power transmission path for transmitting the first actuating power from the first motor to the output section, and
        wherein the sun gear and the planetary gear define a second power transmission path for transmitting the second actuating power from the second motor to the output section.

2. The electric actuator of claim 1, wherein respective axes of the first motor, the rotational member, the second motor, the sun gear, and the planetary gear are parallel to one another.

3. The electric actuator of claim 2, further comprising:
    a first sun gear configured to be rotated by the first motor;
    at least one first planetary gear meshing with the first sun gear; and
    a first internal gear having internal teeth that meshes with the at least one first planetary gear, and rotation of the first internal gear being restrained,
    wherein the rotational member rotates in accordance with revolution of the at least one first planetary gear around an axis of the first sun gear.

4. The electric actuator of claim 3, wherein the controller is configured for controlling electric current supply to the first motor to stop the operation of the first motor and controlling electric current supply to the second motor to continue the rotation of the second sun gear, when the at least one first planetary gear becomes unrotatable on its axis.

5. The electric actuator of claim 3, wherein the controller is configured for controlling electric current supply to the first motor and the second motor, wherein the electric current supply is stopped to one of the first motor and the second motor for which the respective planetary gear becomes unrotatable on its axis, while the electric current supply is continued to the other of the first motor and the second motor for which the respective planetary gear is still rotatable on its axis.

6. The electric actuator of claim 3, wherein the controller is configured for controlling the first motor and the second motor to rotate the output section, wherein the output section is configured to rotate in a first direction by one of the first motor and the second motor and to rotate in a second direction opposite to the first direction by the other of the first motor and the second motor.

7. The electric actuator of claim 3, wherein the first internal gear is fixedly attached to the case to keep the first internal gear from rotating relative to the case.

8. The electric actuator of claim 3, wherein the at least one first planetary gear is directly coupled to the rotational member, and wherein the planetary gear is directly coupled to the output section.

9. The electric actuator of claim 1, wherein the first motor and the second motor are arranged in the enclosed space of the case.

10. The electric actuator of claim 1, wherein the first motor and the second motor are arranged outside of the case.

* * * * *